United States Patent
Choi et al.

(10) Patent No.: US 12,550,154 B2
(45) Date of Patent: *Feb. 10, 2026

(54) METHOD FOR TRANSMITTING UPLINK CONTROL INFORMATION IN WIRELESS COMMUNICATION SYSTEM, AND APPARATUS USING SAME

(71) Applicant: WILUS INSTITUTE OF STANDARDS AND TECHNOLOGY INC., Gyeonggi-do (KR)

(72) Inventors: Kyungjun Choi, Gyeonggi-do (KR); Minseok Noh, Seoul (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 268 days.

This patent is subject to a terminal disclaimer.

(21) Appl. No.: 18/138,744

(22) Filed: Apr. 25, 2023

(65) Prior Publication Data

US 2023/0262719 A1    Aug. 17, 2023

Related U.S. Application Data

(63) Continuation of application No. 16/970,341, filed as application No. PCT/KR2019/001934 on Feb. 18, 2019, now Pat. No. 11,683,813.

(30) Foreign Application Priority Data

Feb. 17, 2018 (KR) .................. 10-2018-0018898
Apr. 5, 2018 (KR) .................. 10-2018-0040026
(Continued)

(51) Int. Cl.
*H04W 72/23* (2023.01)
*H04L 1/1812* (2023.01)
*H04W 72/21* (2023.01)

(52) U.S. Cl.
CPC .......... *H04W 72/23* (2023.01); *H04L 1/1812* (2013.01); *H04W 72/21* (2023.01)

(58) Field of Classification Search
CPC . H04W 72/23; H04W 72/21; H04W 72/0446; H04W 72/0457; H04L 1/1812;
(Continued)

(56) References Cited

U.S. PATENT DOCUMENTS 10,200,185 B2    2/2019   You et al.
10,985,893 B2    4/2021   Yoshimoto et al.
(Continued)

FOREIGN PATENT DOCUMENTS

CN    102957500    3/2013
CN    103891182    6/2014
(Continued)

OTHER PUBLICATIONS

Notice of Allowance dated Dec. 28, 2023 for Vietnamese Patent Application No. 1-2020-05353 and its English translation provided by Applicant's foreign counsel.
(Continued)

*Primary Examiner* — Dady Chery
(74) *Attorney, Agent, or Firm* — WOMBLE BOND DICKINSON (US) LLP

(57) ABSTRACT

A base station of a wireless communication system is disclosed. The base station of the wireless communication includes a communication module, and a processor. The processor is configured to, when receiving a physical downlink control channel (PDCCH) indicating a change of a downlink (DL) bandwidth part (BWP), change the DL BWP
(Continued)

based on the PDCCH indicating the change of the DL BWP, and not include a physical downlink shared channel (PDSCH) scheduled by a PDCCH received before receiving the PDCCH indicating the change of the DL BWP in a PDSCH candidate set, and transmit a semi-static HARQ-ACK codebook including hybrid automatic repeat request (HARQ)-ACK information of a physical downlink shared channel (PDSCH) corresponding to the PDSCH candidate set to a base station of the wireless communication system.

12 Claims, 23 Drawing Sheets

(30) Foreign Application Priority Data

| | | | |
|---|---|---|---|
| Apr. 19, 2018 | (KR) | ................. | 10-2018-0045709 |
| May 11, 2018 | (KR) | ................. | 10-2018-0054148 |
| Sep. 27, 2018 | (KR) | ................. | 10-2018-0115377 |

(58) Field of Classification Search
CPC ... H04L 1/1614; H04L 1/1854; H04L 1/1864; H04L 5/001; H04L 5/0055; H04L 1/0041; H04L 1/08; H04L 1/1607; H04L 1/1825; H04L 1/1829; H04L 5/00; H04L 27/26
See application file for complete search history.

(56) References Cited

U.S. PATENT DOCUMENTS

| | | | |
|---|---|---|---|
| 11,102,806 | B2 | 8/2021 | Choi et al. |
| 11,729,788 | B2 | 8/2023 | Choi et al. |
| 2012/0269103 | A1 | 10/2012 | Papasakellariou et al. |
| 2014/0064159 | A1 | 3/2014 | Larsson et al. |
| 2014/0105076 | A1 | 4/2014 | Yang et al. |
| 2014/0293893 | A1 | 10/2014 | Papasakellariou et al. |
| 2015/0003302 | A1 | 1/2015 | Ekpenyong |
| 2015/0078284 | A1 | 3/2015 | Lee et al. |
| 2016/0270060 | A1 | 9/2016 | Kusashima et al. |
| 2017/0012743 | A1 | 1/2017 | Papasakellariou et al. |
| 2017/0134140 | A1 | 5/2017 | Park |
| 2017/0170931 | A1 | 6/2017 | Kusashima et al. |
| 2017/0273056 | A1 | 9/2017 | Papasakellariou |
| 2017/0280454 | A1 | 9/2017 | Kusashima et al. |
| 2017/0332374 | A1 | 11/2017 | Koorapaty et al. |
| 2018/0019843 | A1 | 1/2018 | Papasakellariou |
| 2018/0167931 | A1 | 6/2018 | Papasakellariou |
| 2018/0242320 | A1 | 8/2018 | Wong et al. |
| 2018/0323938 | A1 | 11/2018 | Takeda et al. |
| 2019/0044689 | A1 | 2/2019 | Yiu et al. |
| 2019/0069321 | A1 | 2/2019 | Akkarakaran et al. |
| 2019/0103943 | A1 | 4/2019 | Wang et al. |
| 2019/0132845 | A1 | 5/2019 | Babaei et al. |
| 2019/0141742 | A1 | 5/2019 | Zhou et al. |
| 2019/0199477 | A1 | 6/2019 | Park et al. |
| 2019/0253196 | A1 | 8/2019 | Medles |
| 2019/0320431 | A1 | 10/2019 | Huang et al. |
| 2019/0364592 | A1 | 11/2019 | Bhattad et al. |
| 2020/0077442 | A1 | 3/2020 | Tirucherai et al. |
| 2020/0186301 | A1 | 6/2020 | Nunome et al. |
| 2020/0228231 | A1 | 7/2020 | Fan et al. |
| 2020/0235894 | A1 | 7/2020 | Takeda et al. |
| 2020/0252978 | A1 | 8/2020 | Yi et al. |
| 2020/0259625 | A1 | 8/2020 | Papasakellariou |
| 2020/0295810 | A1 | 9/2020 | Baldemair et al. |
| 2020/0296715 | A1 | 9/2020 | Wang et al. |
| 2020/0322097 | A1 | 10/2020 | Hsieh et al. |
| 2020/0322120 | A1 | 10/2020 | Yang et al. |
| 2020/0351129 | A1 | 11/2020 | Kwak et al. |
| 2020/0351837 | A1* | 11/2020 | Hwang ................. H04L 5/0078 |
| 2020/0358587 | A1 | 11/2020 | Wang et al. |
| 2020/0374045 | A1 | 11/2020 | Yin et al. |
| 2020/0389277 | A1 | 12/2020 | Jia et al. |
| 2021/0076445 | A1 | 3/2021 | Tsai et al. |
| 2021/0084622 | A1 | 3/2021 | Choi et al. |
| 2021/0092762 | A1 | 3/2021 | Choi et al. |

FOREIGN PATENT DOCUMENTS

| | | |
|---|---|---|
| CN | 103957030 | 7/2014 |
| CN | 104737479 | 6/2015 |
| CN | 107005391 | 8/2017 |
| CN | 107371257 | 11/2017 |
| JP | 2014-519252 | 8/2014 |
| KR | 10-2011-0090783 | 8/2011 |
| KR | 10-2013-0101502 A | 9/2013 |
| KR | 10-2014-0070526 | 6/2014 |
| KR | 10-1724220 | 4/2017 |
| KR | 10-2017-0053470 | 5/2017 |
| KR | 10-2017-0091489 | 8/2017 |
| KR | 10-2017-0113464 | 10/2017 |
| KR | 10-2017-0134255 | 12/2017 |
| WO | 2013/029534 | 3/2013 |
| WO | 2013/176511 | 11/2013 |
| WO | 2016/067088 | 5/2016 |
| WO | 2017/050996 A1 | 3/2017 |
| WO | 2019/216729 | 11/2019 |

OTHER PUBLICATIONS

Notice of Hearing dated Jan. 9, 2024 for Indian Patent Application No. 202027036160.
Extended European Search Report dated Jan. 2, 2024 for European Patent Application No. 23174217.2.
Notice of Allowance dated Feb. 1, 2024 for Chinese Patent Application No. 201980013612.5 and its English translation provided by Applicant's foreign counsel.
Office Action dated Aug. 24, 2023 for Chinese Patent Application No. 201980031500.2 and its English translation provided by Applicant's foreign counsel.
Office Action dated Aug. 18, 2023 for Chinese Patent Application No. 201980013612.5 and its English translation provided by Applicant's foreign counsel.
MediaTek Inc.: "Summary of Bandwidth Part Remaining Issues", 3GPP TSG RAN WG1 Meeting AH 1801, R1-1801067, Vancouver, Canada, Jan. 24, 2018, pp. 1-23.
3GPP TS 38.213 V2.0.0. NR; "Physical layer procedures for control." [Technical Specification]. Release 15. Dec. 15, 2017. See pp. 19-49.
Mediatek Inc.; "Summary of Bandwidth Part Operation" R1-1721442, 3GPP TSG RAN WG1 Meeting 91. Reno, USA. Nov. 28, 2017. See pp. 1-22.
International Search Report for PCT/KR2019/001934 mailed on Jun. 13, 2019 and its English translation from WIPO (now published as WO 2019/160387).
Written Opinion of the International Searching Authority for PCT/KR2019/001934 mailed on Jun. 13, 2019 and its English translation by Google Translate (now published as WO 2019/160387).
Notice of Allowance dated Feb. 1, 2023 for European Patent Application No. 19755002.3.
Office Action dated Feb. 13, 2023 for Japanese Patent Application No. 2020-543548 and its English translation provided by Applicant's foreign counsel.
Vivo: "Remaining issues on CBG-based (re)transmission", 3GPP TSG RAN WG1 Meeting #92, R1-1801541, Athens, Greece, Feb. 15, 2018, pp. 1-4.
NTT Docomo, Inc.: "DL/UL scheduling and HARQ management", 3GPP TSG RAN WG1 Meeting AH 1801, R1-1800676, Vancouver, Canada, Jan. 13, 2018, pp. 1-6.
Office Action dated Feb. 27, 2023 for Japanese Patent Application No. 2020-563625 and its English translation provided by Applicant's foreign counsel.
Notice of Allowance dated Mar. 23, 2023 for U.S. Appl. No. 17/364,886.
Notice of Allowance dated Mar. 29, 2023 for Korean Patent Application No. 10-2020-7026437 and its English translation provided by Applicant's foreign counsel.

(56) References Cited

OTHER PUBLICATIONS

Final Office Action dated Nov. 25, 2022 for Korean Patent Application No. 10-2020-7026437 and its English translation provided by Applicant's foreign counsel.
Office Action dated Nov. 25, 2022 for U.S. Appl. No. 17/364,886.
Office Action dated Jul. 4, 2022 for Korean Patent Application No. 10-2020-7026437 and its English translation provided by the Applicant's foreign counsel.
Office Action dated Jun. 29, 2022 for European Patent Application No. 19 755 002.3.
Extended European Search Report dated Jul. 1, 2022 for European Patent Application No. 19798877.7.
Nokia et al.: "Remaining open items on UCI multiplexing", 3GPP TSG RAN WG1 Meeting #92bis, R1-1804460, Sanya, China, Apr. 16-20, 2018, pp. 1-5.
Office Action dated Jun. 29, 2022 for Indian Patent Application No. 202027036160.
Office Action dated Jul. 19, 2022 for Japanese Patent Application No. 2020-563625 and its English translation provided by the Applicant's foreign counsel.
NTT Docomo, Inc.: "DL/UL scheduling and HARQ management", 3GPP TSG RAN WG1 Meeting 90bis, R1-1718217, Prague, CZ, Oct. 9-13, 2017, pp. 1-14.
Qualcomm Incorporated: "Summary of remaining issues for UCI multiplexing on PUSCH", 3GPP TSG RAN WG1 Meeting #92bis, R1-1805666, Sanya, China, Apr. 16-20, 2018, pp. 1-10.
Office Action dated Feb. 16, 2022 for European Patent Application No. 19798877.7.
Office Action dated Feb. 25, 2022 for Indian Patent Application No. 202027049112.
International Preliminary Report on Patentability for PCT/KR2019/001934 issued on Aug. 18, 2020 and its English translation from WIPO (now published as WO 2019/160387).
International Search Report for PCT/KR2019/005718 mailed on Sep. 5, 2019 and its English translation from WIPO (now published as WO 2019/216729).
Written Opinion of the International Searching Authority for PCT/KR2019/005718 mailed on Sep. 5, 2019 and its English translation from WIPO (now published as WO 2019/216729).
International Preliminary Report on Patentability for PCT/KR2019/005718 issued on Nov. 17, 2020 and its English translation from WIPO (now published as WO 2019/216729).
Office Action dated Jan. 13, 2021 for U.S. Appl. No. 17/089,334 (now published as US 2021/0092762).
Notice of Allowance dated Apr. 29, 2021 for U.S. Appl. No. 17/089,334 (now published as US 2021/0092762).
Extended European Search Report dated Dec. 9, 2021 for European Patent Application No. 19755002.3.
VIVO: "Remaining issues on BWP operation", 3GPP TSG RAN WG1 Meeting #92, R1-1801544, Athens, Greece, Feb. 26-Mar. 2, 2018, pp. 1-5.
Notice of Allowance for U.S. Appl. No. 16/970,341 dated Jan. 24, 2023 (now published as US 2021/0084622).
Final Office Action for U.S. Appl. No. 16/970,341 dated Sep. 9, 2022 (now published as US 2021/0084622).
Office Action for U.S. Appl. No. 16/970,341 dated Mar. 4, 2022 (now published as US 2021/0084622).
Office Action dated Jul. 26, 2024 for U.S. Appl. No. 18/215,116.
Notice of Allowance dated Aug. 13, 2024 for European Patent Application No. 23 174 216.4.
Notice of Allowance dated Sep. 2, 2024 for Japanese Patent Application No. 2023-110889 and its English translation provided by Applicant's foreign counsel.
Office Action (2nd) dated Apr. 8, 2025 for Japanese Patent Application No. 2023-109999 and its English translation provided by Applicant's foreign counsel.
Office Action dated Jun. 10, 2025 for U.S. Appl. No. 18/138,745.
Notice of Allowance dated Oct. 4, 2024 for European Patent Application No. 23 174 217.2.
Office Action dated Oct. 28, 2024 for Japanese Patent Application No. 2023-109998 and its English translation provided by Applicant's foreign counsel.
Office Action dated Oct. 28, 2024 for Japanese Patent Application No. 2023-109999 and its English translation provided by Applicant's foreign counsel.
Notice of Allowance dated Nov. 20, 2024 for U.S. Appl. No. 18/215,116.
Notice of Allowance dated Nov. 26, 2024 for Korean Patent Application No. 10-2020-7031469 and its English translation provided by Applicant's foreign counsel.
Office Action dated Mar. 4, 2024 for Korean Patent Application No. 10-2020-7031469 and its English translation provided by Applicant's foreign counsel.
Notice of Allowance dated Mar. 15, 2024 for Chinese Patent Application No. 201980031500.2 and its English translation provided by Applicant's foreign counsel.
Notice of Allowance dated Apr. 1, 2024 for Vietnamese Patent Application No. 1-2020-07013 and its English translation provided by Applicant's foreign counsel.
Office Action dated May 20, 2024 for Japanese Patent Application No. 2023-110889 and its English translation provided by Applicant's foreign counsel.
Office Action dated Jun. 20, 2024 for Korean Patent Application No. 10-2023-7014127 and its English translation provided by Applicant's foreign counsel.
CATT: "Corrections on carrier aggregation and bandwidth part operation", 3GPP TSG RAN WG1 Meeting #94, R1-1808381, Gothenburg, Sweden, Aug. 11, 2018, pp. 1-14.
Qualcomm Incorporated: "Remaining Issues on BWP", 3GPP TSG RAN WG1 Meeting #92bis, R1-1804809, Sanya, China, Apr. 7, 2018, pp. 1-18.
Office Action dated Jun. 20, 2024 for Korean Patent Application No. 10-2023-7014128 and its English translation provided by Applicant's foreign counsel.
Extended European Search Report dated Oct. 30, 2023 for European Patent Application No. 23 174 216.4.
Notice of Allowance dated Nov. 14, 2023 for European Patent Application No. 19 755 002.3.
Extended European Search Report dated Jul. 16, 2025 for European Patent Application No. 25172751.7.
Office Action (1st) dated Oct. 9, 2025 for European Patent Application No. 19 798 877.7.

\* cited by examiner

METHOD FOR TRANSMITTING UPLINK CONTROL INFORMATION IN WIRELESS COMMUNICATION SYSTEM, AND APPARATUS USING SAME

CROSS-REFERENCE TO RELATED APPLICATIONS

This application is a continuation of U.S. patent application Ser. No. 16/970,341 filed on Aug. 14, 2020, which is the U.S. National Stage of International Patent Application No. PCT/KR2019/001934, filed on Feb. 18, 2019, which claims the priority to Korean Patent Application No. 10-2018-0018898, filed in the Korean Intellectual Property Office on Feb. 17, 2018, Korean Patent Application No. 10-2018-0040026, filed in the Korean Intellectual Property Office on Apr. 5, 2018, Korean Patent Application No. 10-2018-0045709, filed in the Korean Intellectual Property Office on Apr. 19, 2018, Korean Patent Application No. 10-2018-0054148, filed in the Korean Intellectual Property Office on May 11, 2018, and Korean Patent Application No. 10-2018-0115377 filed in the Korean Intellectual Property Office on Sep. 27, 2018, the entire contents of which are incorporated herein by reference.

TECHNICAL FIELD

The present invention relates to a wireless communication system. Specifically, the present invention relates to an uplink control information transmission of a wireless communication system and an apparatus using the same.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

DISCLOSURE

Technical Problem

An object of an embodiment of the present invention is to provide a method and apparatus for transmitting a signal efficiently in a wireless communication system. Also, an object of an embodiment of the present invention is to provide a method for transmitting uplink control information in a wireless communication system and an apparatus using the same.

Technical Solution

A user equipment of a wireless communication system according to an embodiment of the present invention includes a communication module and a processor configured to control the communication module. The processor is configured to, when receiving a physical downlink control channel (PDCCH) indicating a change of a downlink (DL) bandwidth part (BWP), change the DL BWP based on the PDCCH indicating the change of the DL BWP, and not include a physical downlink shared channel (PDSCH) scheduled by a PDCCH received before receiving the PDCCH indicating the change of the DL BWP in a PDSCH candidate set, and transmit a semi-static HARQ-ACK codebook including hybrid automatic repeat request (HARQ)-ACK information of a physical downlink shared channel (PDSCH) corresponding to the PDSCH candidate set to a base station of the wireless communication system.

When the user equipment receives the PDCCH indicating the change of the DL BWP before a predetermined advanced time from a start symbol of a physical uplink control channel (PUCCH) transmission including the semi-static HARQ-ACK codebook, the processor may be configured to change the DL BWP and not include the PDSCH scheduled by a PDCCH received before receiving the PDCCH indicating the change of the DL BWP in the PDSCH candidate set.

The predetermined advanced time may be specified by the number of symbols.

The predetermined advanced time may be determined according to a capability of a user equipment and a subcarrier spacing.

When reception of a PDSCH repeated in a plurality of slots is configured, the processor may be configured to determine the PDSCH candidate set based on whether PDSCH reception is available in all of the plurality of slots.

When the user equipment determines that PDSCH reception is unavailable in all of the plurality of slots, the user equipment may not include the PDSCH repeated in the plurality of slots in the PDSCH candidate set.

The processor may be configured to determine the PDSCH candidate set based on whether at least one of symbols to which PDSCH reception is allocated corresponds to an uplink (UL) symbol.

When at least one of symbols to which reception of a first PDSCH is allocated corresponds to a UL symbol, the processor may be configured to not include the first PDSCH in the PDSCH candidate set.

When at least one of symbols to which reception of a second PDSCH is allocated is a symbol used for PRACH transmission, the processor may be configured to not include the second PDSCH in the PDSCH candidate set.

When reception of a PDSCH repeated in a plurality of slots is configured and the user equipment determines that PDSCH reception is unavailable in all of the plurality of slots, the processor may be configured to not include the PDSCH repeated in the plurality of slots in the PDSCH candidate set, and when the user equipment determines that the reception of the PDSCH is unavailable in all of the plurality of slots, the processor may be configured to determine, when at least one of symbols to which PDSCH reception is allocated corresponds to an UL symbol in any one slot, that PDSCH reception is unavailable in a corresponding slot.

The processor may be configured to determine the PDSCH candidate set based on a time required for processing HARQ-ACK information for a PDSCH.

When the time required for HARQ-ACK information processing for a third PDSCH is longer than a time from the end of the last symbol of the third PDSCH to the start symbol of a physical uplink control channel (PUCCH) including the semi-static HARQ-ACK codebook, the processor may be configured to not include the third PDSCH in the PDSCH candidate set.

The time from the end of the last symbol of the third PDSCH to the start symbol of the PUCCH including the semi-static HARQ-ACK codebook may be determined by the number of symbols.

A method of operating a user equipment of a wireless communication system according to an embodiment of the present invention includes, when receiving a physical downlink control channel (PDCCH) indicating a change of a downlink (DL) bandwidth part (BWP), changing the DL BWP based on the PDCCH indicating the change of the DL BWP, and not including a physical downlink shared channel (PDSCH) scheduled by a PDCCH received before receiving the PDCCH indicating the change of the DL BWP in a PDSCH candidate set, and transmitting a semi-static HARQ-ACK codebook including hybrid automatic repeat request (HARQ)-ACK information of a physical downlink shared channel (PDSCH) corresponding to the PDSCH candidate set to a base station of the wireless communication system.

The not including the PDSCH scheduled by the PDCCH received before the receiving of the PDCCH indicating the change of the DL BWP in the PDSCH candidate set may include, when the user equipment receives the PDCCH indicating the change of the DL BWP before a predetermined advanced time from a start symbol of a physical uplink control channel (PUCCH) transmission including the semi-static HARQ-ACK codebook, changing the DL BWP and not including the PDSCH scheduled by a PDCCH received before receiving the PDCCH indicating the change of the DL BWP in the PDSCH candidate set.

The predetermined advanced time may be specified by the number of symbols.

The predetermined advanced time may be determined according to a capability of a user equipment and a subcarrier spacing.

The method may further include, when reception of a PDSCH repeated in a plurality of slots is configured, determining the PDSCH candidate set based on whether PDSCH reception is available in all of the plurality of slots.

The method may further include determining the PDSCH candidate set based on whether at least one of symbols to which PDSCH reception is allocated corresponds to an uplink (UL) symbol.

The method may further include determining the PDSCH candidate set based on a time required for processing HARQ-ACK information for a PDSCH.

Advantageous Effects

One embodiment of the present invention provides a method for efficiently transmitting uplink control information in a wireless communication system and an apparatus using the same.

Effects obtainable from various embodiments of the present disclosure are not limited to the above-mentioned effects, and other effects not mentioned above may be clearly derived and understood to those skilled in the art from the following description.

MODE FOR CARRYING OUT THE INVENTION

Figure 1:
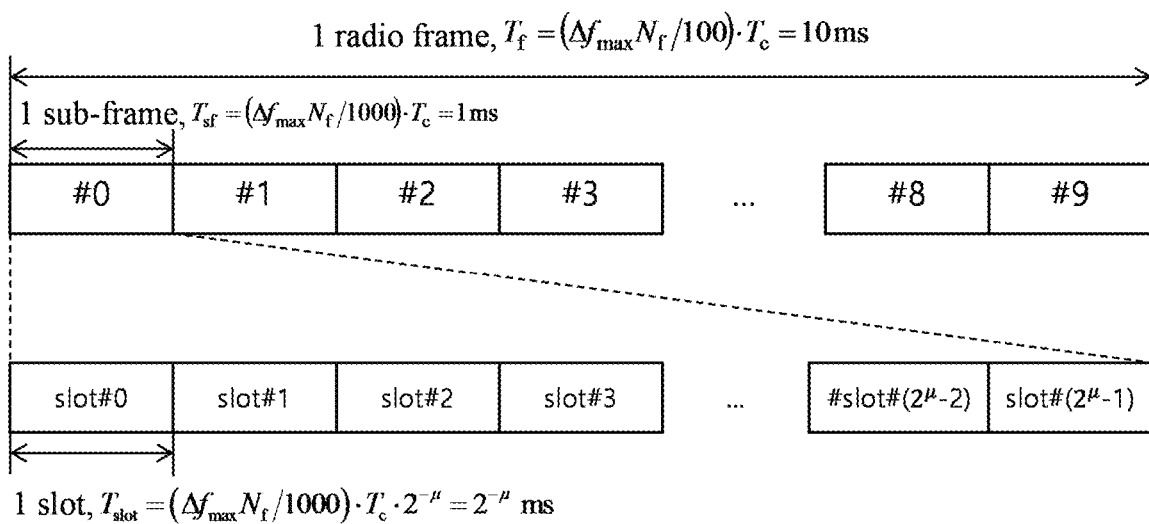
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100)*T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and $\mu$ can have a value of $\mu$=0, 1, 2, 3, 4 as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
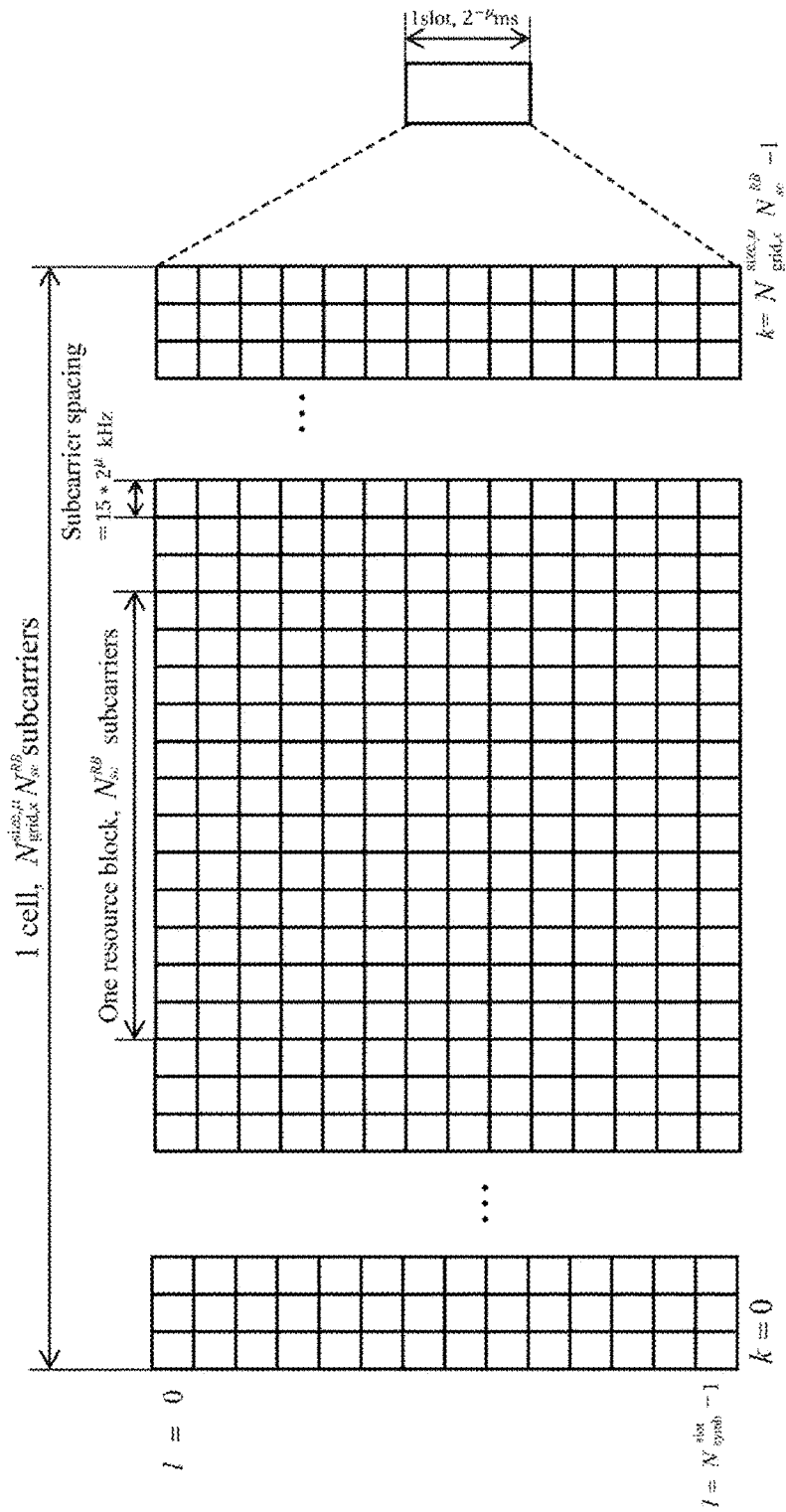
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, l) in one slot. k may be an index assigned from 0 to $N^{size,\mu}_{grid,x}*N^{RB}_{sc}-1$ in the frequency domain, and l may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is unavailable. In the UL symbol, UL transmission is possible, but DL transmission is unavailable. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

Figure 3:
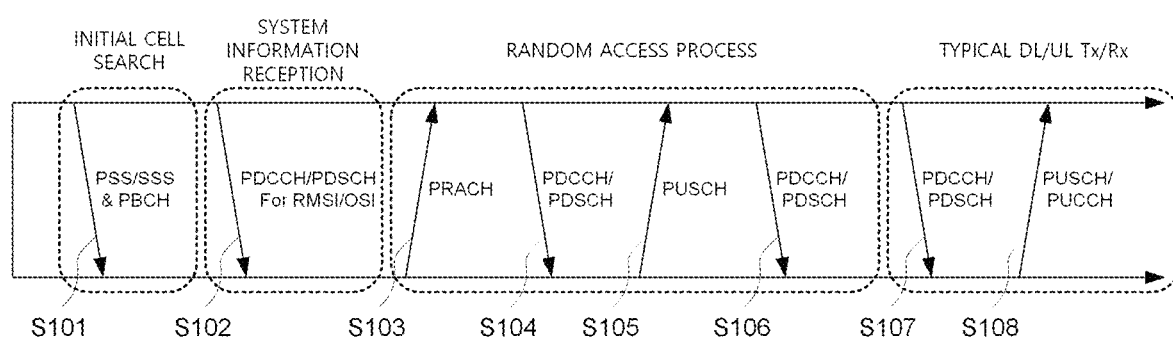
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Herein, the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received

TABLE 1

| | Symbol number in a slot | | | | | | | | | | | | | | | Symbol number in a slot | | | | | | | | | | | | | |
| --- | --- | --- | --- | --- | --- | --- | --- | --- | --- | --- | --- | --- | --- | --- | --- | --- | --- | --- | --- | --- | --- | --- | --- | --- | --- | --- | --- | --- | --- |
| index | 0 | 1 | 2 | 3 | 4 | 5 | 6 | 7 | 8 | 9 | 10 | 11 | 12 | 13 | index | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D | 28 | D | D | D | D | D | D | D | D | D | D | D | X | U |
| 1 | U | U | U | U | U | U | U | U | U | U | U | U | U | U | 29 | D | D | D | D | D | D | D | D | D | D | X | X | U |
| 2 | X | X | X | X | X | X | X | X | X | X | X | X | X | X | 30 | D | D | D | D | D | D | D | D | D | X | X | X | U |
| 3 | D | D | D | D | D | D | D | D | D | D | D | D | D | X | 31 | D | D | D | D | D | D | D | D | D | D | X | U | U |
| 4 | D | D | D | D | D | D | D | D | D | D | D | D | X | X | 32 | D | D | D | D | D | D | D | D | D | X | X | U | U |
| 5 | D | D | D | D | D | D | D | D | D | D | D | X | X | X | 33 | D | D | D | D | D | D | D | D | X | X | X | U | U |
| 6 | D | D | D | D | D | D | D | D | D | D | X | X | X | X | 34 | D | X | U | U | U | U | U | U | U | U | U | U | U |
| 7 | D | D | D | D | D | D | D | D | D | X | X | X | X | X | 35 | D | D | X | U | U | U | U | U | U | U | U | U | U |
| 8 | X | X | X | X | X | X | X | X | X | X | X | X | X | U | 36 | D | D | D | X | U | U | U | U | U | U | U | U | U |
| 9 | X | X | X | X | X | X | X | X | X | X | X | X | U | U | 37 | D | X | U | U | U | U | U | U | U | U | U | U | U |
| 10 | X | U | U | U | U | U | U | U | U | U | U | U | U | U | 38 | D | D | X | X | U | U | U | U | U | U | U | U | U |
| 11 | X | X | U | U | U | U | U | U | U | U | U | U | U | U | 39 | D | D | D | X | X | U | U | U | U | U | U | U | U |
| 12 | X | X | X | U | U | U | U | U | U | U | U | U | U | U | 40 | D | X | X | X | U | U | U | U | U | U | U | U | U |
| 13 | X | X | X | X | U | U | U | U | U | U | U | U | U | U | 41 | D | D | X | X | X | U | U | U | U | U | U | U | U |
| 14 | X | X | X | X | X | U | U | U | U | U | U | U | U | U | 42 | D | D | D | X | X | X | U | U | U | U | U | U | U |
| 15 | X | X | X | X | X | X | U | U | U | U | U | U | U | U | 43 | D | D | D | D | D | D | D | D | D | X | X | X | U |
| 16 | D | X | X | X | X | X | X | X | X | X | X | X | X | X | 44 | D | D | D | D | D | X | X | X | X | X | X | U | U |
| 17 | D | D | X | X | X | X | X | X | X | X | X | X | X | X | 45 | D | D | D | D | D | X | X | U | U | U | U | U | U |
| 18 | D | D | D | X | X | X | X | X | X | X | X | X | X | X | 46 | D | D | D | D | X | U | D | D | D | D | D | X | U |
| 19 | D | X | X | X | X | X | X | X | X | X | X | X | X | U | 47 | D | D | X | U | U | U | D | D | X | U | U | U | U |
| 20 | D | D | X | X | X | X | X | X | X | X | X | X | X | U | 48 | D | X | U | U | U | U | D | X | U | U | U | U | U |
| 21 | D | D | D | X | X | X | X | X | X | X | X | X | X | U | 49 | D | D | D | X | X | U | D | D | D | X | X | U | U |
| 22 | D | X | X | X | X | X | X | X | X | X | X | X | U | U | 50 | D | D | X | U | U | U | D | D | X | U | U | U | U |
| 23 | D | D | X | X | X | X | X | X | X | X | X | X | U | U | 51 | D | X | U | U | U | U | D | X | U | U | U | U | U |
| 24 | D | D | D | X | X | X | X | X | X | X | X | X | U | U | 52 | D | X | X | X | U | U | D | X | X | X | X | X | U |
| 25 | D | X | X | X | X | X | X | X | X | X | X | U | U | U | 53 | D | D | X | X | X | U | D | D | X | X | X | X | U |
| 26 | D | D | X | X | X | X | X | X | X | X | X | U | U | U | 54 | X | X | X | X | X | X | D | D | D | D | D | D | D |
| 27 | D | D | D | X | X | X | X | X | X | X | U | U | U | U | 55 | D | D | X | X | X | U | U | U | D | D | D | D | D |
| 56-255 | | | | | | | | | | | | | | | Reserved | | | | | | | | | | | | | | |

In Table 1, D denotes a DL symbol, U denotes a UL symbol, and X denotes a flexible symbol. As shown in Table 1, up to two DL/UL switching in one slot may be allowed.

by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The UE may obtain UE-specific system information for normal operating of the UE in the physical layer in RRC layer during a random access process. When the UE obtain the UE-specific system information, the UE enter RRC connecting mode (RRC_CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4:
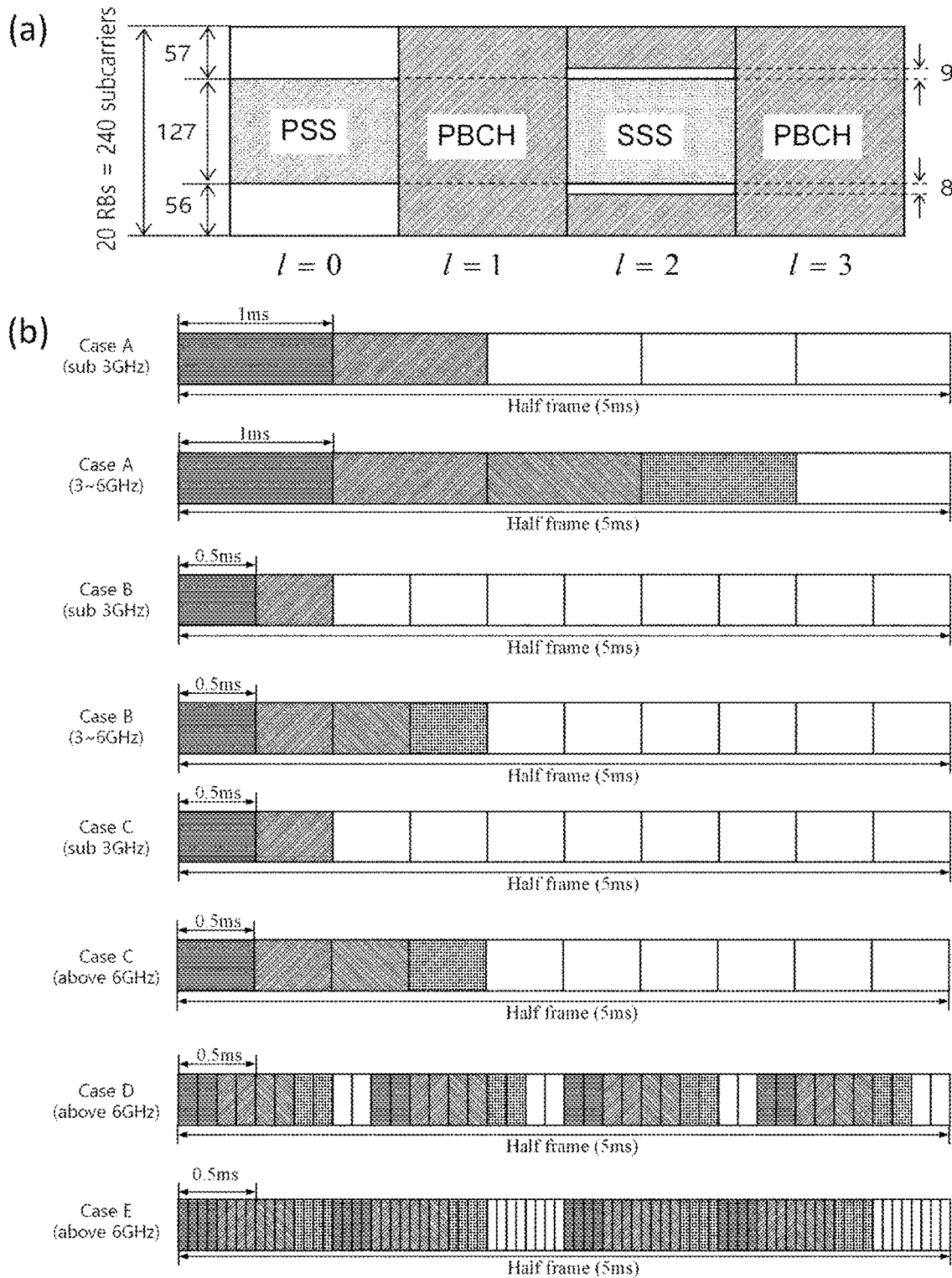
FIG. 4 illustrates an SS/PBCH block for initial cell access in a 3GPP NR system.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4A, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4A and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number l relative to the start of an SS/PBCH block | Subcarrier number k relative to the start of an SS/PBCH block |
| --- | --- | --- |
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n)=1-2x(m)$$

$$m=(n+43N_{ID}^{(2)})\mod 127$$

$$0 \le n < 127$$

Here, $x(i+7)=(x(i+4)+x(i))\mod 2$ and is given as
[x(6) x(5) x(4) x(3) x(2) x(1) x(0)]=[1 1 1 0 1 1 0]
Further, the sequence $d_{SSS}(n)$ of the SSS is as follows.

$$d_{SSS}(n) = [1 - 2x_0((n+m_0) \mod 127)][1 - 2x_1((n+m_1) \mod 127)]$$

$$m_0 = 15\left\lfloor \frac{N_{ID}^{(1)}}{112} \right\rfloor + 5N_{ID}^{(2)}$$

$$m_1 = N_{ID}^{(1)} \mod 112$$

$$0 \le n < 127$$

Here, $$x_0(i+7) = (x_0(i+4) + x_0(i)) \mod 2$$
$$x_1(i+7) = (x_1(i+1) + x_1(i)) \mod 2$$

and is given as

[$x_0(6)$ $x_0(5)$ $x_0(4)$ $x_0(3)$ $x_0(2)$ $x_0(1)$ $x_0(0)$]=[0 0 0 0 0 0 1]
[$x_1(6)$ $x_1(5)$ $x_1(4)$ $x_1(3)$ $x_1(2)$ $x_1(1)$ $x_1(0)$]=[0 0 0 0 0 0 1]

A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5:
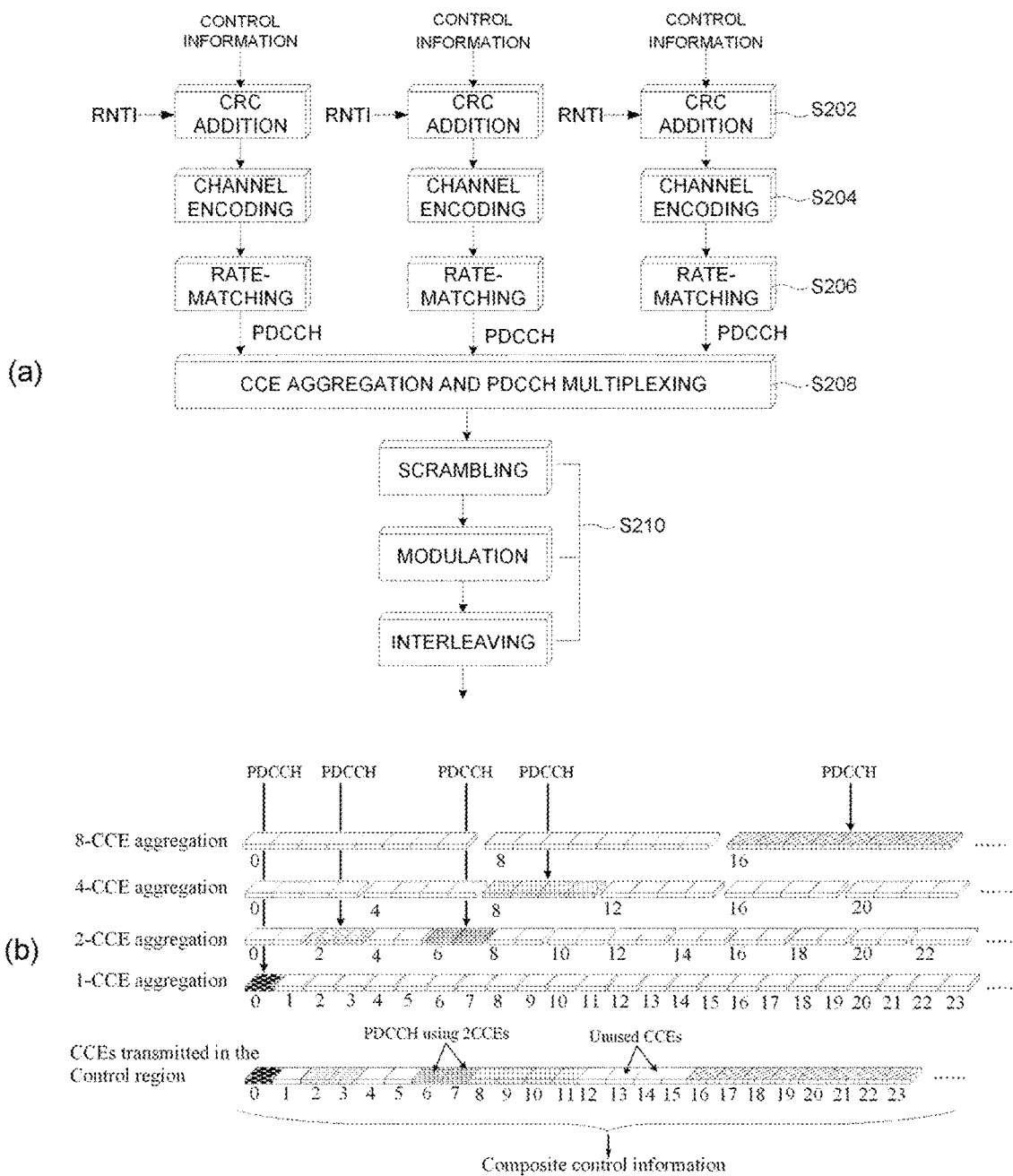
FIG. 5 illustrates a procedure for transmitting control information and a control channel in a 3GPP NR system.

FIG. 5 illustrates a procedure for transmitting control information and a control channel in a 3GPP NR system. Referring to FIG. 5A, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
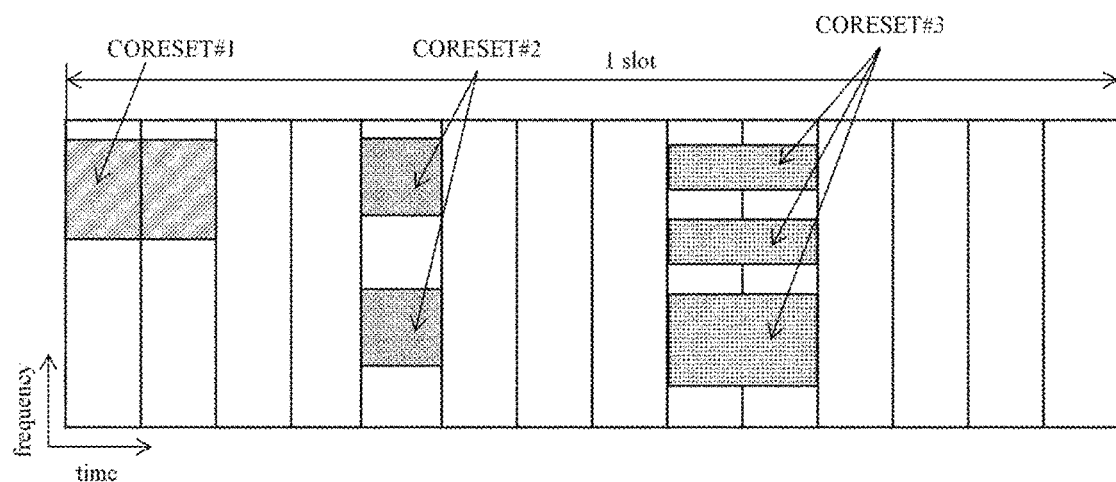
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
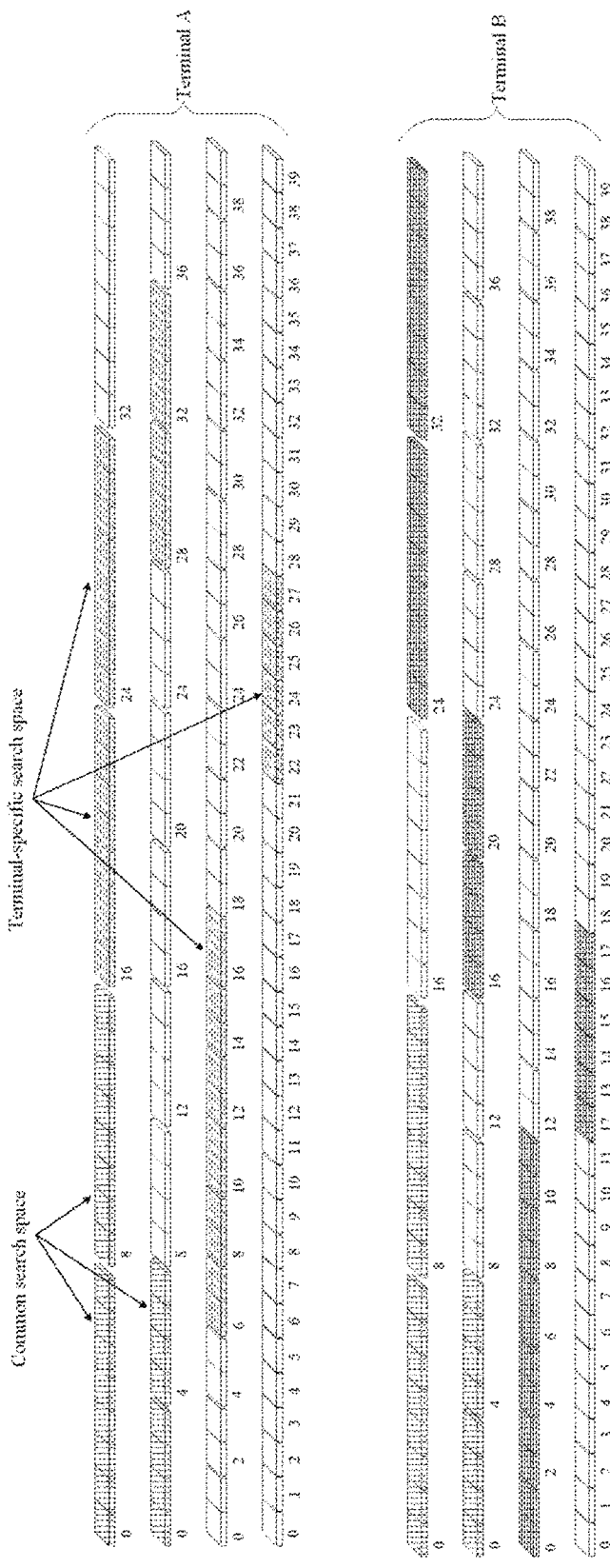
FIG. 7 illustrates a method for configuring a PDCCH search space in a 3GPP NR system.

FIG. 7 illustrates a method for setting a PUCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARM). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this case, the sequence may be a sequence cyclic shifted (CS) from a base sequence used in PUCCH format 0. Through this, the UE may obtain a frequency diversity gain. In more detail, the UE may determine a cyclic shift (CS) value $m_{cs}$ according to $M_{bit}$ bit UCI ($M_{bit}$=1 or 2). In addition, the base sequence having the length of 12 may be transmitted by mapping a cyclic shifted sequence based on a predetermined CS value $m_{cs}$ to one OFDM symbol and 12 REs of one RB. When the number of cyclic shifts available to the UE is 12 and $M_{bit}$=1, 1 bit UCI 0 and 1 may be mapped to two cyclic shifted sequences having a difference of 6 in the cyclic shift value, respectively. In addition, when $M_{bit}$=2, 2 bit UCI 00, 01, 11, and 10 may be mapped to four cyclic shifted sequences having a difference of 3 in cyclic shift values, respectively.

PUCCH format 1 may deliver 1-bit or 2-bit HARQ-ACK information or SR. PUCCH format 1 maybe transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , d($M_{symbol}$−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI ($M_{bit}$>2) with π/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$=$M_{bit}$/2. The UE may not apply block-unit spreading to the PUCCH format 3.

However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
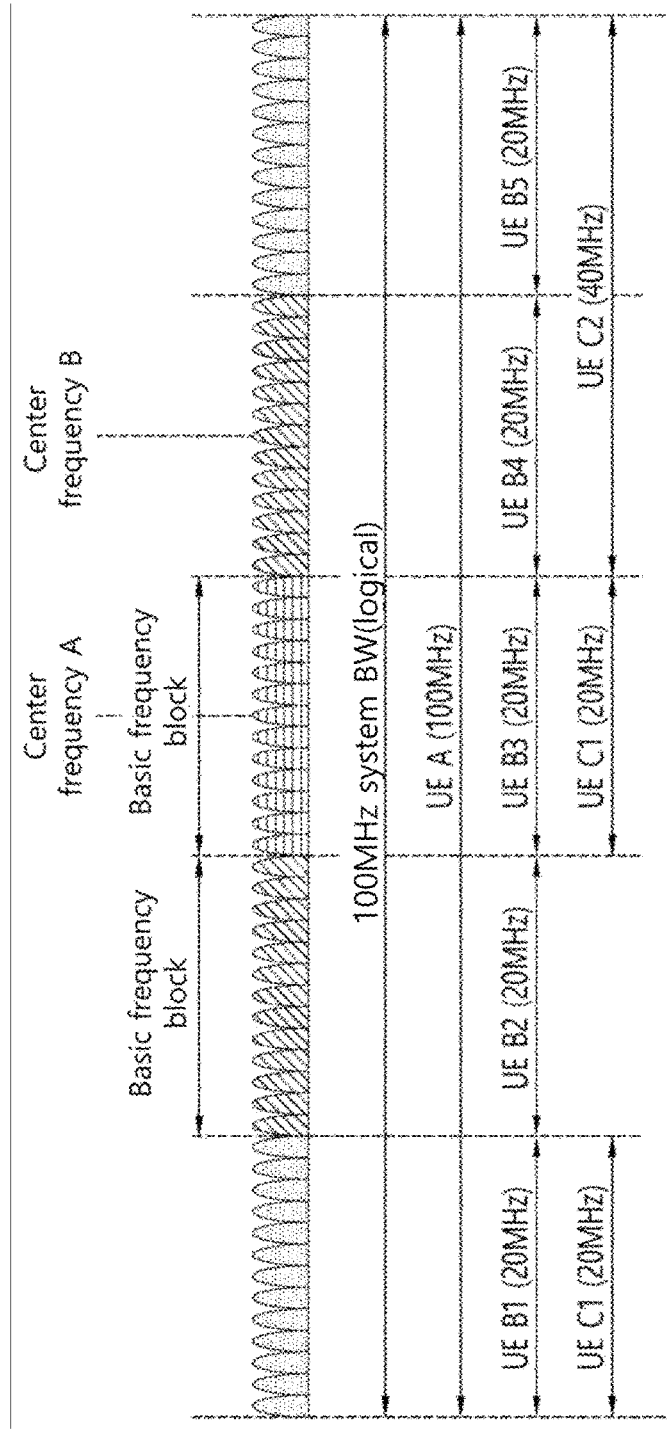
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1 \sim B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
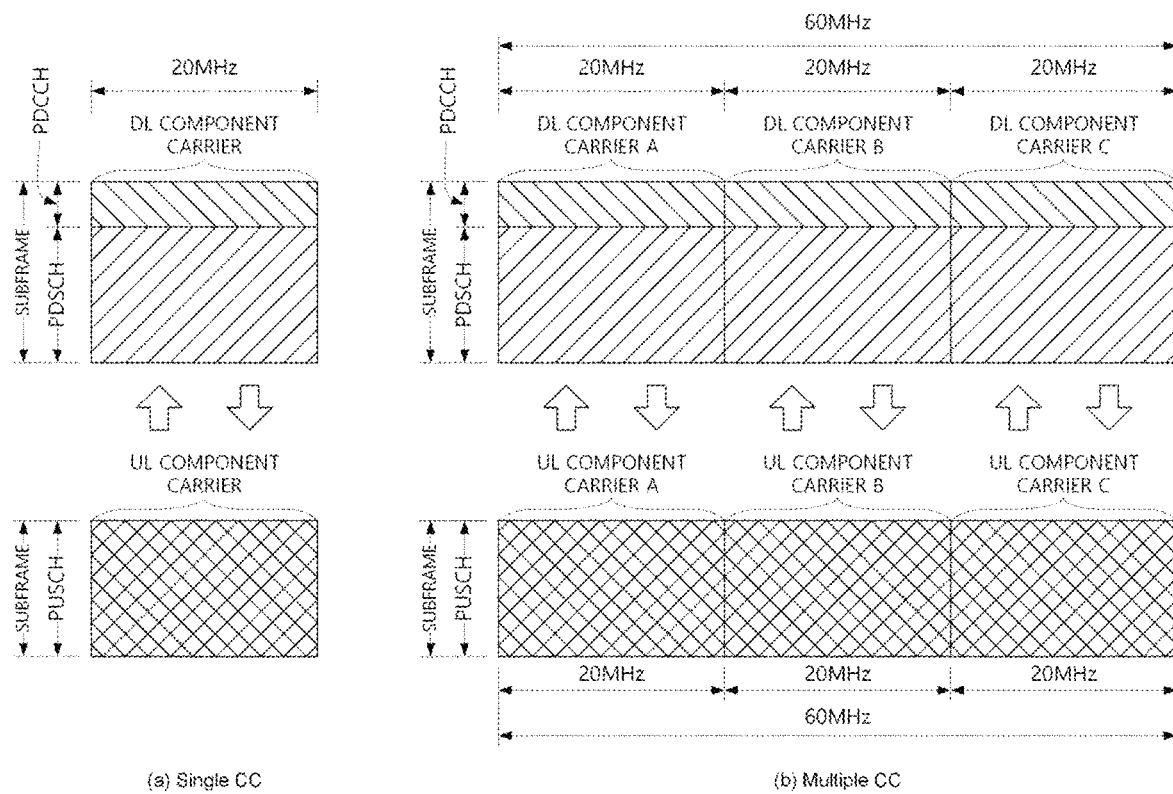
FIG. 9 is a diagram for explaining signal carrier communication and multiple carrier communication.

FIG. 9 is a drawing for explaining signal carrier communication and multiple carrier communication. Particularly, FIG. 9A shows a single carrier subframe structure and FIG. 9B shows a multi-carrier subframe structure.

Referring to FIG. 9A, in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9B, three 20 MHz component carriers (CCs) can be aggregated into each of UL and DL, so that a bandwidth of 60 MHz can be supported. Each CC may be adjacent or non-adjacent to one another in the frequency domain. FIG. 9B shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
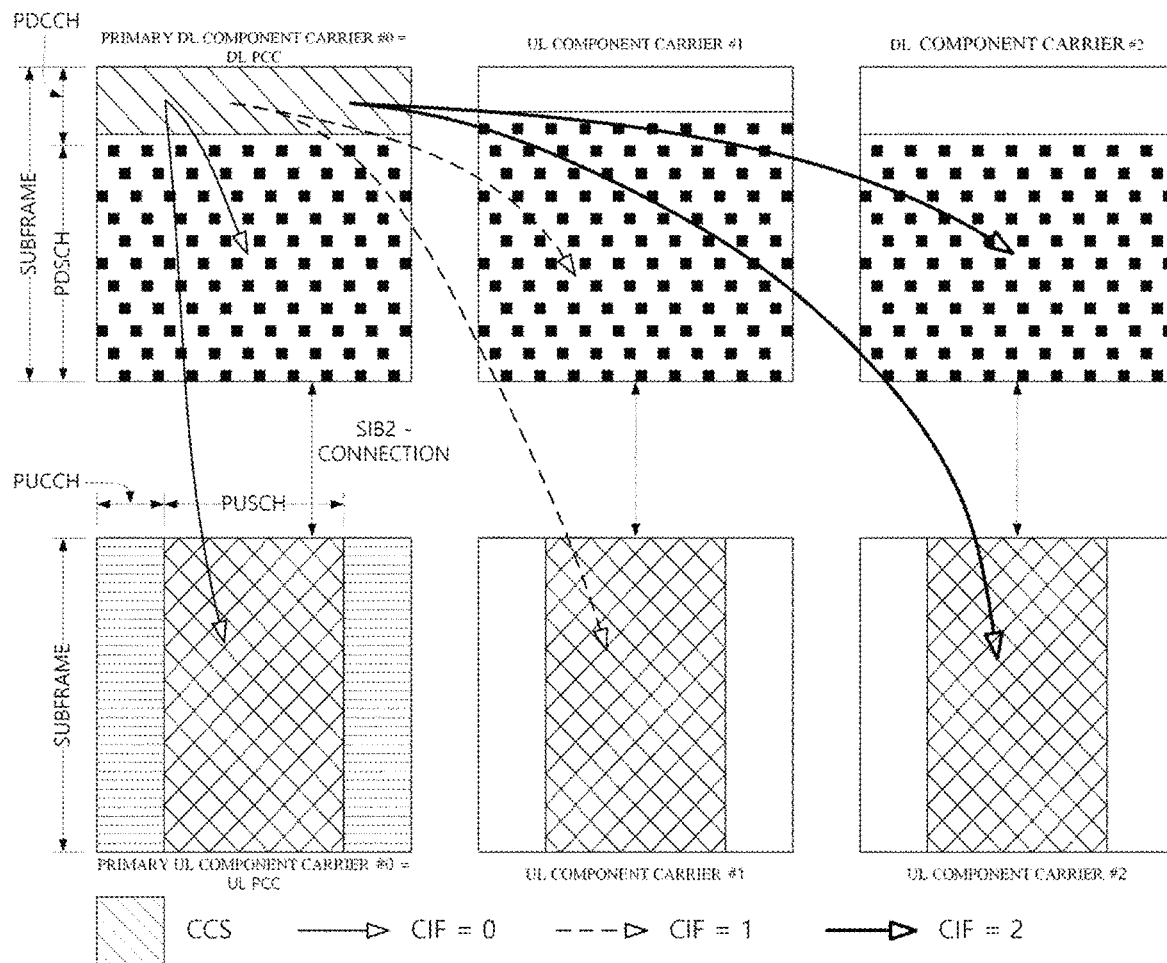
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
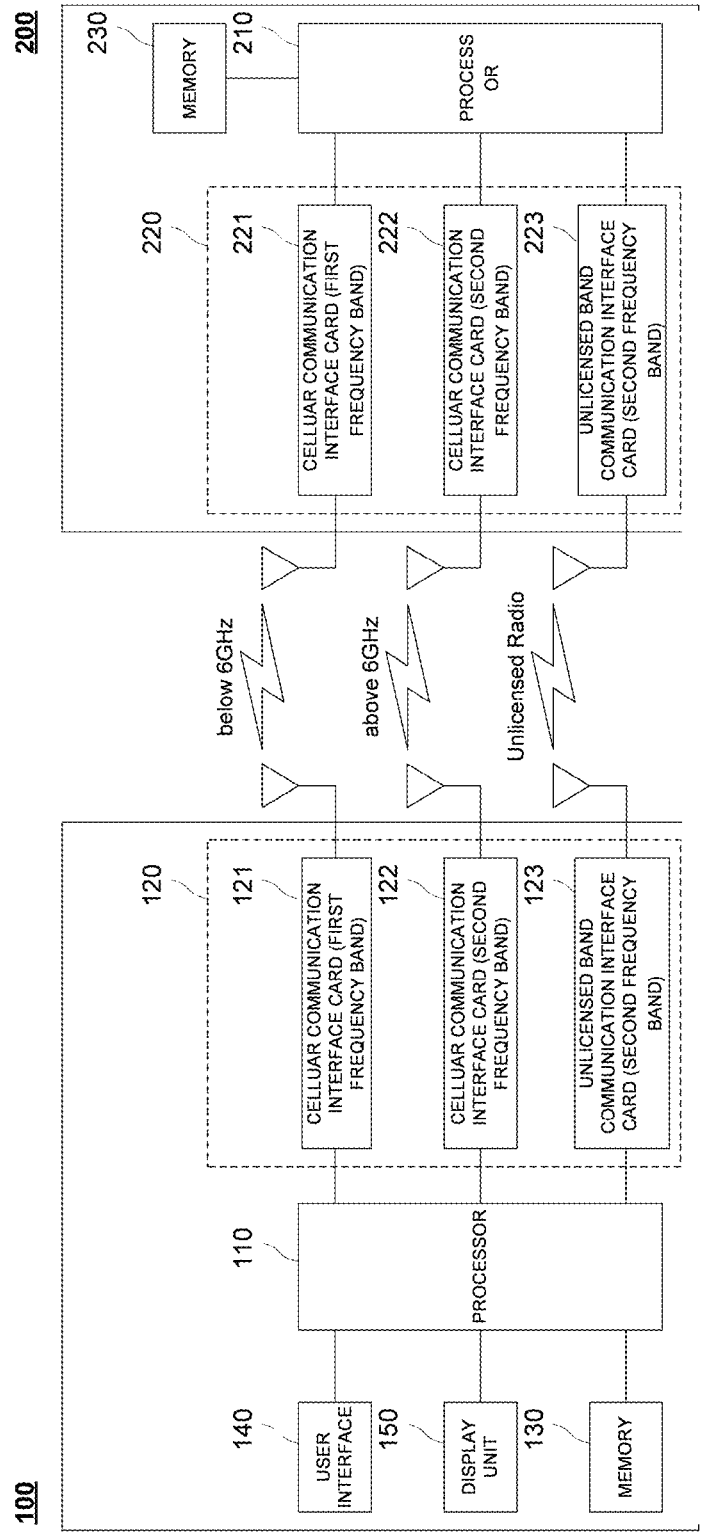
FIG. 11 is a block diagram showing the configurations of a UE and a base station according to an embodiment of the present invention.

FIG. 11 is a block diagram showing the configurations of a UE and a base station according to an embodiment of the present disclosure. In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the base station 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the base station 100, an external device, and a server in accordance with the cellular communication standards or protocols in the frequency bands less than 6 GHz supported by the corresponding NIC module.

The cellular communication interface card 222 may transmit or receive a radio signal with at least one of the base station 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the base station 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

The downlink assignment index (DAI) indicates information on the number of HARQ-ACKs included in a hybrid automatic repeat request (HARQ)-ACK codebook indicating whether a plurality of PDSCHs are successful or not by the user equipment to the base station. The user equipment may receive DAI through a PDCCH scheduling PDSCH. Specifically, the DAI may be divided into a counter-DAI and a total-DAI. The total-DAI indicates the number of PDSCHs transmitted through the same HARQ-ACK codebook. The counter-DAI indicates which PDSCH among PDSCHs indicated by the same total-DAI. The DCI scheduling the PDSCH may include a value of the counter-DAI corresponding to the PDSCH scheduled. Also, the DCI scheduling the PDSCH may include a value of total-DAI corresponding to the PDSCH scheduled.

Figure 12:
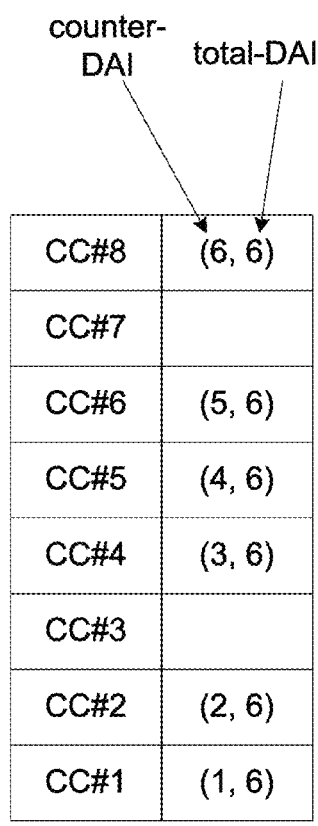
FIG. 12 shows a value of a downlink assignment index (DAI) mapped to each component carrier according to an embodiment of the present invention.

FIG. 12 shows a value of a downlink assignment index (DAI) mapped to each component carrier according to an embodiment of the present invention.

In FIG. 12, the PDCCH scheduling each PDSCH includes a counter-DAI (counter-DAI) and a total-DAI (counter-DAI). The counter-DAI indicates the cumulative number of PDSCH(s) scheduled in the previous monitoring occasion and the PDSCHs scheduled from the first component carrier CC #1 to the corresponding component carrier in the current monitoring occasion. The monitoring occasion refers to the time interval in which DCI is received on the time axis. In addition, the total-DAI indicates the total number of scheduled PDSCHs on all component carriers until the current monitoring occasion. The user equipment may determine the order in which the PDSCHs scheduled by the corresponding PDCCH are transmitted by decoding the PDCCH. In this case, the user equipment may transmit HARQ-ACK of the PDSCH according to the order in which the corresponding PDSCH is transmitted.

Referring to FIG. 12, the base station may transmit to the user equipment that can be used by aggregating up to 8 component carriers the PDSCH through the first component carrier CC #1, the second component carrier CC #2, the fourth component carrier CC #4, the fifth component carrier CC #5, the sixth component carrier CC #6, and the eighth component carrier CC #8. Since the total number of PDSCHs scheduled on the component carrier is 6, the value of total-DAI is set to 5. Thus, (Counter-DAI, total-DAI) values of component carriers such as the first component carrier CC #1, the second component carrier CC #2, the fourth component carrier CC #4, the fifth component carrier CC #5, the sixth component carrier CC #6, and the eighth component carrier CC #8 are set to (0, 5), (1, 5), (2, 5), (3, 5), (4, 5), and (5, 5), respectively. When the user equipment fails to receive the PDCCH transmitted through the fourth component carrier CC #3, the user equipment may determine that reception of one PDCCH (and reception of one PDSCH corresponding thereto) fails based on the value of the counter-DAI of the PDCCH transmitted through the second component carrier CC #2 and the value of the counter-DAI of the PDCCH transmitted through the fifth component carrier CC #4. Also, when the user equipment fails to decode the PDCCH transmitted through the eighth component carrier CC #7, the user equipment may determine that one PDSCH is scheduled after the sixth component carrier CC #5 but is not successfully received based on the value of the counter-DAI and the value of the total-DAI of the PDCCH transmitted through the sixth component carrier CC #5.

In the present invention, the DCI including both the counter-DAI and the total-DAI is referred to as DCI format A. In addition, the DCI including the counter-DAI and not including the total-DAI is referred to as DCI format B. Since the included DAI is different according to the DCI format, the base station and the user equipment may be confused about the PDSCH which ACK/NACK is indicated through the HARQ-ACK codebook. Therefore, a method for preventing this may be necessary. A method of configuring total-DAI and Counter DAI will be described with reference to FIGS. 13 to 14.

Each of the total-DAI and counter DAI may be indicated by a field with 2 bits. However, embodiments of the present invention can be applied even when each of the total-DAI and the counter DAI is indicated by a field of a different size than the 2-bit field. In addition, an embodiment of the present invention will be described through an embodiment of transmitting HARQ-ACK information on TB-based PDSCH transmission. In the following description, it is assumed that the PDSCH includes one TB unless otherwise specified. In addition, it is assumed that DCI is transmitted through a plurality of component carriers in one monitoring occasion in an embodiment to be described later. The monitoring occasion is a time interval for receiving DCI on the time axis. When any one DCI includes a total-DAI value, the value of the total-DAI transmitted in a monitoring occasion in which the corresponding DCI is transmitted should be the same as the value of the total-DAI of the corresponding DCI. In addition, the value of the total-DAI may be updated to the latest value for each monitoring occasion.

Figure 13:
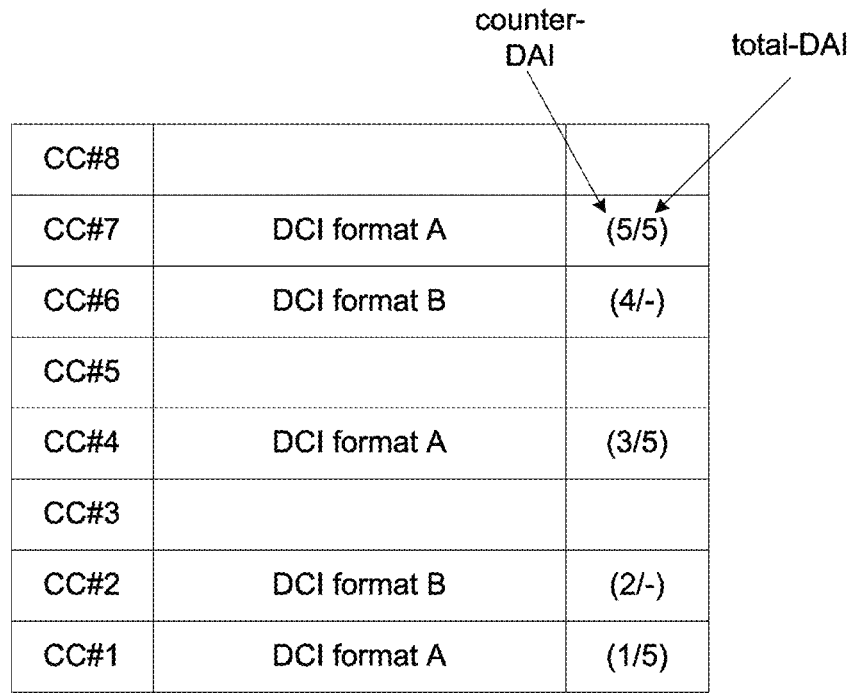
FIG. 13 shows a DAI value indicated by DCI transmitted from a base station according to an embodiment of the present invention to a user equipment.

FIG. 13 shows a DAI value indicated by DCI transmitted from a base station according to an embodiment of the present invention to a user equipment.

In an embodiment of the present invention, the base station may determine the value of the counter-DAI and the value of the total-DAI regardless of the DCI format. The base station may set the value of the counter-DAI to the number of PDSCHs which correspond to the same total-DAI and are transmitted based on TB from the first component carrier to the current component carrier. In addition, the base station may set the value of the total-DAI to the number of PDSCHs which correspond to the total DAI and are transmitted based on TB. For example, in (a) of FIG. 12, three DCI format A transmissions and two DCI format B transmissions are scheduled on eight component carriers. The base station respectively sets the values of the counter-DAI and the total-DAI of DCI format A transmitted through the first component carrier CC #1 to 1 and 5. In addition, the base station sets the value of the counter-DAI of DCI format B transmitted through the second component carrier CC #2 to 2. In addition, the base station respectively sets the values of the counter-DAI and the total-DAI of DCI format A transmitted through the fourth component carrier CC #4 to 3 and 5. In addition, the base station sets the value of the counter-DAI of DCI format B transmitted through the second component carrier CC #6 to 4. In addition, the base station respectively sets the values of counter-DAI and the total-DAI of DCI format A transmitted through the seventh component carrier CC #7 to 5. In this embodiment, if the user equipment fails to receive all of DCI format A, the user equipment cannot determine the total-DAI even if the user equipment receives all DCI format B. For example, in (a) of FIG. 13, when the user equipment fails to receive all of DCI format A, and the user equipment receives all DCI format B, the user equipment may generate a 4-bit HARQ-ACK codebook to transmit the generated HARQ-ACK codebook to the base station through the PDCCH. Since the base station expects to receive the 5 bit HARQ-ACK codebook, the base station is likely to fail to receive the HARQ-ACK codebook transmitted by the user equipment.

In another specific embodiment, the base station may set the value of the counter-DAI differently according to the DCI format. Within one monitoring occasion, the counter-DAI of DCI format A is first indexed and the counter-DAI of DCI format B is indexed. Specifically, the counter-DAI of DCI format A indicates the number of DCI format A and DCI format B transmitted until the previous monitoring occasion and DCI format A transmitted in the current monitoring occasion to the corresponding component carrier. The counter-DAI of DCI format B indicates the number of DCI format A and DCI format B transmitted until the corresponding monitoring occasion and all DCI format A of the current monitoring occasion and the DCI format B included up to the corresponding component carrier of the current monitoring occasion. The total-DAI of DCI format A indicates the number of DCI format A and DCI format B transmitted until the current monitoring occasion. The base station may indicate the value of the counter-DAI of DCI format B from a value obtained by adding 1 to the total-DAI of DCI format A in the monitoring occasion. In this case, the value of the counter-DAI of DCI format B is calculated by incrementing by 1 based on the order of component carriers. That is, the base station may set the value of the counter-DAI of DCI format B to a value obtained by adding the total number of DCI format A to the number of DCI format B from the first component carrier to the component carrier transmitting the corresponding DCI format B. In addition, the base station calculates the value of the counter-DAI of DCI format A from 1 according to the order of component carriers. That is, the base station can set the value of the counter-DAI to the number of DCI format A from the first component carrier to the component carrier transmitting the corresponding DCI format A. In the above description, the total number of DCI format A indicates the number of DCI format A transmitted until the current monitoring occasion.

For example, in (b) of FIG. 13, three DCI format A transmissions and two DCI format B transmissions are scheduled on eight component carriers. The first component carrier CC #1 is the component carrier in the most advanced position. Since the DCI scheduling 5 PDSCHs on the current monitoring occasion is transmitted, the value of the total-DAI is 5. The base station sets the value of the counter-DAI of DCI format A transmitted through the first component carrier CC #1, which is a component carrier corresponding to the lowest frequency band of DCI format A, to 1. The base station sets the value of the counter-DAI of DCI format A transmitted through the fourth component carrier CC #4, which is a component carrier corresponding to the second lowest frequency band of DCI format A, to 2. The base station sets the value of the counter-DAI of DCI format A transmitted through the seventh component carrier CC #7, which is a component carrier corresponding to the third lowest frequency band of DCI format A, to 3. The base station sets the value of the counter-DAI of DCI format B transmitted through the second component carrier CC #2, which is a component carrier corresponding to the lowest frequency band of DCI format B, to 4. The value of the counter-DAI is set to 4 because three DCI format As are transmitted. The base station sets the value of the counter-DAI of DCI format B transmitted through the sixth component carrier CC #6, which is a component carrier corresponding to the second lowest frequency band of DCI format B, to 5. In this embodiment, even if the user equipment fails to receive all of DCI format A and the user equipment fails to receive all of DCI format B, when the user equipment receives at least one DCI format A, the user equipment can obtain the value of the total-DAI. In addition, even if the user equipment fails to receive all of DCI format A, when the user equipment receives the last DCI format B, the user equipment can determine the value of the total-DAI based on the counter-DAI of the last DCI format B. In a specific embodiment, the user equipment may determine the counter-DAI received in the last component carrier as total-DAI. For example, in (b) of FIG. 12, when the user equipment fails to receive all of the DCI format A, and the user equipment receives the last DCI format B, the user equipment may determine 5, which is the value of the counter-DAI of the last DCI format B, as total-DAI. Therefore, the user equipment can generate the 5-bit HARQ-ACK codebook and transmit the generated HARQ-ACK codebook to the base station through PUCCH. Since the base station expects to receive the 5 bit HARQ-ACK codebook, the base station can receive the HARQ-ACK codebook transmitted by the user equipment.

Figure 14:
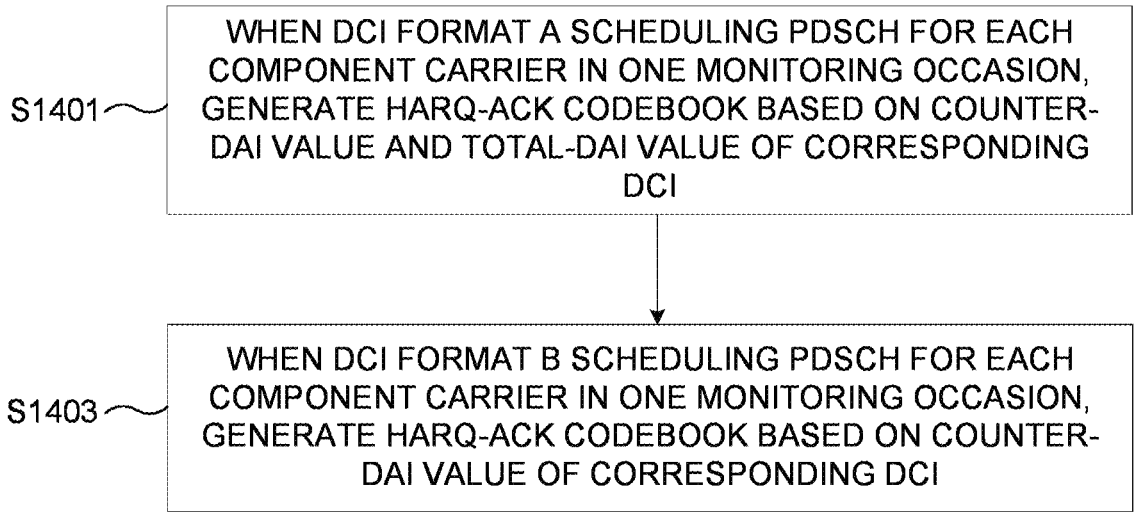
FIG. 14 shows an operation in which a user equipment according to an embodiment of the present invention generates an HARQ-ACK codebook.

FIG. 14 shows an operation in which a user equipment according to an embodiment of the present invention generates an HARQ-ACK codebook.

The user equipment determines whether DCI format A scheduling PDSCH for each component carrier is transmitted in one monitoring occasion. When the user equipment finds the component carrier in which the DCI format A scheduling the PDSCH is transmitted, the user equipment may generate an HARQ-ACK codebook based on the values of the counter-DAI and the total-DAI of the DCI (S1401). The user equipment may perform this operation on all component carriers used in one monitoring occasion. In a specific embodiment, the user equipment increases the index value by 1 from the component carrier with the lowest index and determines whether DCI format A scheduling PDSCH is transmitted for each component carrier.

The user equipment determines whether DCI format B scheduling PDSCH for each component carrier is transmitted in one monitoring occasion. When the user equipment finds the component carrier in which the DCI format B scheduling the PDSCH is transmitted, the user equipment may generate an HARQ-ACK codebook based on the value of the counter-DAI of the corresponding DCI (S1403). The user equipment may perform this operation on all component carriers used in one monitoring occasion. In a specific embodiment, the user equipment may increase the index value by 1 from the component carrier with the lowest index and may determine whether DCI format B scheduling PDSCH is transmitted for each component carrier. When the user equipment receives DCI format A in the preceding step (S1401), the user equipment may generate an HARQ-ACK codebook using the value of total-DAI, indicated by the DCI format A. If the user equipment does not receive DCI format A in the preceding step (S1401), the user equipment may generate an HARQ-ACK codebook based on the largest value of the values of the counter-DAI indicated by the DCI format B found by the user equipment. The user equipment may perform the operations of the above two steps (S1401 and S1403) for each new monitoring occasion.

The user equipment may piggyback the HARQ-ACK codebook on the PUSCH to transmit the HARQ-ACK codebook. For this, DCI scheduling PUSCH may indicate the value of the total-DAI. If the CBG-based transmission is not configured in all component carriers by the base station, the total-DAI may be indicated by a 2-bit field. When CBG reception is configured on at least one component carrier by the base station, total-DAI may be indicated by a 4-bit field. In this case, the first 2 bits may indicate a value of the total-DAI for TB-based transmission, and the remaining 2 bits may indicate a value of the total-DAI value for CBG-based transmission. When the user equipment receives the PUSCH including the total-DAI, the user equipment may generate an HARQ-ACK codebook using the value of the total-DAI of the corresponding PUSCH.

The user equipment may not transmit the HARQ-ACK codebook through PUSCH. That is, the user equipment can generate a 0-bit HARQ-ACK codebook. If the CBG-based transmission is not configured in all component carriers by the base station, the value of the total-DAI, is indicated as a specific value, and the user equipment has not received any DCI scheduling PDSCH during the monitoring occasion, the user equipment may not transmit the HARQ-ACK codebook through PUSCH. In addition, if the CBG-based transmission is configured in at least one component carrier by the base station, the value of the total-DAI, is indicated as a specific value, and the user equipment has not received any DCI scheduling PDSCH during the monitoring occasion, the user equipment may not transmit the HARQ-ACK codebook through PUSCH. In the above embodiments, the specific value of total-DAI may be 4. In this case, the value of the total-DAI field may be $11_b$.

In addition, when the TB-based transmission is configured in at least one component carrier by the base station, the first 2-bit total-DAI value is set to a specific value, and the user equipment has not received any DCI scheduling the TB-based PDSCH during the monitoring occasion, the user equipment may not transmit the HARQ-ACK sub-codebook of TB based transmission through PUSCH. In this case, a specific value of the first 2-bit total-DAI may be 4. In this case, the value of the total-DAI field may be $11_b$. In addition, when the CBG-based transmission is configured in at least one component carrier by the base station, the last 2-bit total-DAI value is set to a specific value, and the user equipment has not received any DCI scheduling the CBG-based PDSCH during the monitoring occasion, the user equipment may not transmit the HARQ-ACK sub-codebook of the CBG-based transmission through PUSCH. In this case, a specific value of the last 2-bit total-DAI may be 4. In this case, the value of the total-DAI field may be $11_b$.

In an NR wireless communication system, a user equipment may transmit HARQ-ACK information using a semi-static HARQ-ACK codebook. When the semi-static HARQ-ACK codebook is used, the base station may configure, using the RRC signal, the length of the HARQ-ACK codebook and each bit of the HARQ-ACK codebook to indicate which PDSCH's ACK/NACK. Therefore, it is not necessary for the base station to signal information necessary for HARQ-ACK codebook transmission whenever HARQ-ACK codebook transmission is required. The set of PDSCHs for which ACK/NACK is indicated by the semi-static HARQ-ACK codebook is referred to as a set of PDSCH candidates. Hereinafter, a method for the user equipment to determine the PDSCH candidate set will be described with reference to FIGS. 15 to 25.

The user equipment determines a set of PDSCH candidates based on information signaled from the base station. In this case, the information signaled from the base station may include K1. K1 indicates a difference between slots in which PUCCH is transmitted from the last slot in which PDSCH is received or scheduled. The fallback DCI may indicate a K1 value of 1 to 8. The non-fallback DCI may indicate one of up to eight values configured by the RRC signal as the K1 value. In addition, the information signaled from the base station may include K0, and a combination of the start symbol of PDSCH and the length of the PDSCH. In this case, K0 indicates a difference between a slot in which the PDCCH is received and a slot in which the PDSCH scheduled by the corresponding PDCCH is transmitted. Also, the combination of the start symbol of the PDSCH and the length of the PDSCH may be encoded in a start and length indicator value (SLIV) format. The base station may signal up to 16 K0 values and the combination of the PDSCH start symbol and length. The user equipment may obtain one combination of 16 combinations in DCI scheduling the PDSCH. The user equipment may obtain information on the time domain in which the PDSCH is received from the K0 value indicated by the DCI and the PDSCH start symbol and length.

In addition, the information signaled from the base station may include a semi-static DL/UL configuration. The semi-static DL/UL configuration indicates symbol configuration information of a slot configured through the cell-specific RRC signal or the UE-specific RRC signal. Specifically, it may indicate whether each symbol included in the slot is a DL symbol, a UL symbol, or a flexible symbol. The user equipment may determine a set of PDSCH candidates based on whether any one of the symbols to which the PDSCH is allocated corresponds to the UL symbol. This is because PDSCH cannot be received in a symbol corresponding to the UL symbol. In a specific embodiment, when any one of the symbols to which the PDSCH is allocated corresponds to the UL symbol, the user equipment may not include the PDSCH in the PDSCH candidate set. When all of the symbols to which the PDSCH is allocated do not correspond to the UL symbol, the user equipment may include the corresponding PDSCH in the PDSCH candidate set. This will be described in detail with reference to FIG. 15.

In addition, the information signaled from the base station may include information on CORESET and configuration of a search space. The information on the set of CORESET and search space may indicate at which position of which slot the PDCCH can be received.

Also, the information signaled from the base station may include a PDSCH repetition value. The base station may receive the same PDSCH as many times as indicated by the PDSCH repetition value while receiving the PDSCH for each slot. In this case, the user equipment may start receiving PDSCH at the same symbol position in each slot. In addition, the user equipment may receive the PDSCH using the same length in each slot. The base station may set the PDSCH repetition value to any one of 1, 2, 4 and 8 using the RRC signal. When the value of PDSCH repetition is greater than 1, it may be referred to as using slot aggregation. When the repetition reception of the PDSCH is configured to be repeated in a plurality of slots, the user equipment may determine whether the conditions for including the PDSCH in the PDSCH candidate set are satisfied based on whether PDSCH reception is available in all slots in which the PDSCH is received. Specifically, when the user equipment determines that PDSCH reception is unavailable in all slots indicated that the PDSCH is repeatedly received. The user equipment may not include the PDSCH in the PDSCH candidate set. In another embodiment, when PDSCH reception is available in at least one of the slots indicated as PDSCH reception, the user equipment may include the corresponding PDSCH in the PDSCH candidate set. An embodiment related to this will be described in detail through the contents after FIG. 23.

Figure 15:
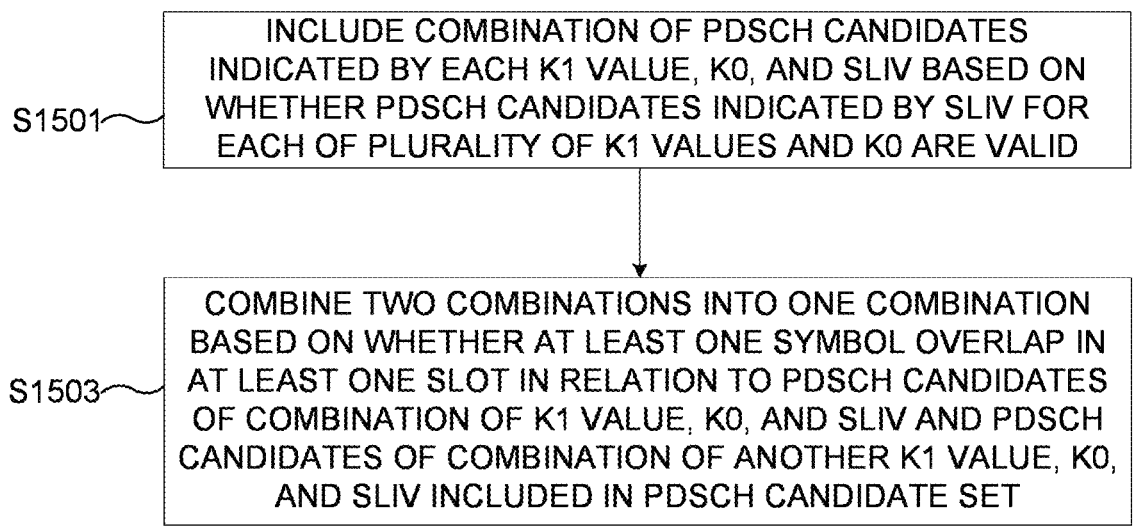
FIG. 15 shows an operation in which a user equipment according to an embodiment of the present invention determines a PDSCH candidate set.

FIG. 15 shows an operation in which a user equipment according to an embodiment of the present invention determines a PDSCH candidate set.

The user equipment includes, based on whether the PDSCH candidate indicated by SLIV is valid for each of a plurality of K1 values and K0, a combination of PDSCH candidates indicated by each of K1 values, and K0 and SLIV in the PDSCH candidate set (S1501). For each of the plurality of K1 values and K0, it may be determined whether a PDSCH candidate indicated by the SLIV is valid. When a combination of PDSCH candidates indicated by the corresponding K1 value, K0, and SLIV is valid, the user equipment may include a combination of PDSCH candidates indicated by the corresponding K1 value, K0, and SLIV in the PDSCH candidate set. For convenience of description, a slot through which PUCCH is transmitted is referred to as an n-th slot. In relation to all of the (n−K1)-th slot, the (n−K1−1)-th slot, . . . and (n−K1−($N_{rep}$−1))-th slot, when any one of the symbols indicated by the SLIV as symbols to which the PDSCH is allocated corresponds to the UL symbol in the corresponding slot, the user equipment may determine that the PDSCH candidate indicated by the SLIV is not valid for the corresponding K1 value and K0. In this case, $N_{rep}$ indicates the number of slots in which PDSCH is repeated and received. As described above, $N_{rep}$ can be configured through an RRC signal. In addition, when PDSCH repetition is not used, it may be $N_{rep}$=1. In this case, when any of the symbols which are indicated by the SLIV as symbols to which the PDSCH is allocated in the (n−K1)-th slot corresponds to the UL symbol, the user equipment may determine that the PDSCH candidate indicated by the SLIV is not valid for the corresponding K1 value and K0. In addition, when the search space does not exist in the (n−K1−($N_{rep}$−1)−K0)-th slot, the user equipment may determine that the PDSCH candidate indicated by the SLIV is not valid for the corresponding K1 value and K0. As described above, when PDSCH repetition is not used, it may be $N_{rep}$=1. Specifically, when all symbols which are indicated by the SLIV as symbols to which the PDSCH is allocated do not correspond to a UL symbol in any one slot of the (n−K1)-th slot, the (n−K1−1)-th slot, . . . and the (n−K1−($N_{rep}$−1))-th slot and a search space exists in the (n−K1−($N_{rep}$−1)−K0)-th slot, the user equipment may determine that the PDSCH candidate indicated by the SLIV is valid for the corresponding K1 value and K0. When the user equipment determines that the PDSCH candidate indicated by the SLIV value is invalid, the user equipment may not include a combination of PDSCH candidates indicated by the corresponding K1 value, K0, and SLIV in the PDSCH candidate set. Specifically, a specific method in which the user equipment determines whether the PDSCH candidate is valid will be described with reference to FIGS. 16 to 18.

Figure 16:
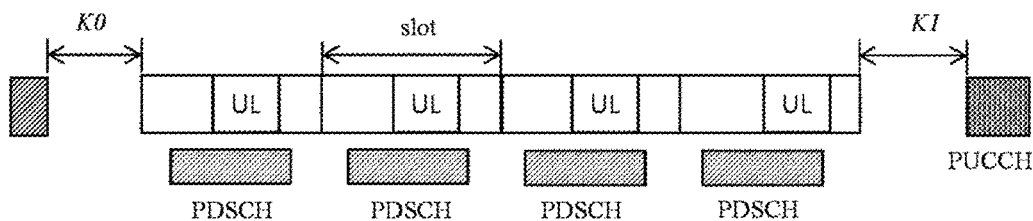
FIG. 16 shows determining whether to include, in the PDSCH candidate set, the PDSCH candidate indicated by the SLIV signaled to the user equipment according to an embodiment of the present invention according to K1 and K0.

FIG. 16 shows determining whether to include, in the PDSCH candidate set, the PDSCH candidate indicated by the SLIV signaled to the user equipment according to an embodiment of the present invention according to K1 and K0.

In the embodiment of FIG. 16, in relation to all of the (n−K1)-th slot, the (n−K1−1)-th slot, . . . and the (n−K1−($N_{rep}$−1))-th slot, any one of the symbols which are indicated, in the corresponding slot, by the SLIV that the PDSCH is allocated to corresponds to the UL symbol. Therefore, the user equipment determines that the PDSCH candidate indicated by the SLIV for the corresponding K1 value and K0 is invalid. The user equipment does not include the combination of PDSCH candidates indicated by the K1 value, K0 and SLIV in the PDSCH candidate set.

Again, FIG. 15 is described.

The user equipment combines two combinations into one combination based on whether a PDSCH candidate of a combination of a K1 value, K0, and SLIV included in the PDSCH candidate set and a PDSCH candidate of a combination of another K1 value, K0, and SLIV included in the PDSCH candidate set overlap in at least one symbol of any one slot (S1503). The user equipment may determine whether the PDSCH candidate of a combination of a K1 value, K0, and SLIV included in the PDSCH candidate set and the PDSCH candidate of a combination of another K1 value, K0, and SLIV included in the PDSCH candidate set overlap in at least one symbol of any one slot. When the PDSCH candidate of a combination of a K1 value, K0, and SLIV included in the PDSCH candidate set and the PDSCH candidate of a combination of another K1 value, K0, and SLIV included in the PDSCH candidate set overlap in at least one symbol of any one slot, the user equipment may combine two combinations into one combination. In a specific embodiment, when the PDSCH candidate set includes N combinations, the user equipment may determine whether the PDSCH candidate of the n-th combination overlaps the PDSCH candidate of each of the combinations of m=n+1, . . . N. In this case, the user equipment may perform operations related to overlap determination from n=0 to n=N−1 sequentially.

The user equipment may determine, based on the position of the last symbol of the PDSCH included in the PDSCH candidate set, the position of HARQ-ACK information of the corresponding PDSCH in the semi-static HARQ-ACK codebook. Specifically, the user equipment may determine, according to the position of the last symbol of the PDSCH included in the PDSCH candidate set, the position of the bit indicating the ACK/NACK of the corresponding PDSCH in the HARQ-ACK codebook. Specifically, the position of the HARQ-ACK information of the PDSCH of which the last symbol is preceding may also be preceding. For example, when the last symbol of the first PDSCH is before the last symbol of the second PDSCH, in the HARQ-ACK codebook, the bit indicating the ACK/NACK of the first PDSCH may precede the bit indicating the ACK/NACK of the second PDSCH.

As described above, when any of the symbols to which a PDSCH is allocated corresponds to the UL symbol, the user equipment may not include the PDSCH in the PDSCH candidate set. In this case, the user equipment may additionally consider at least one of PRACH and SS/PBCH. This will be described with reference to FIGS. 17 to 18.

Figure 17:
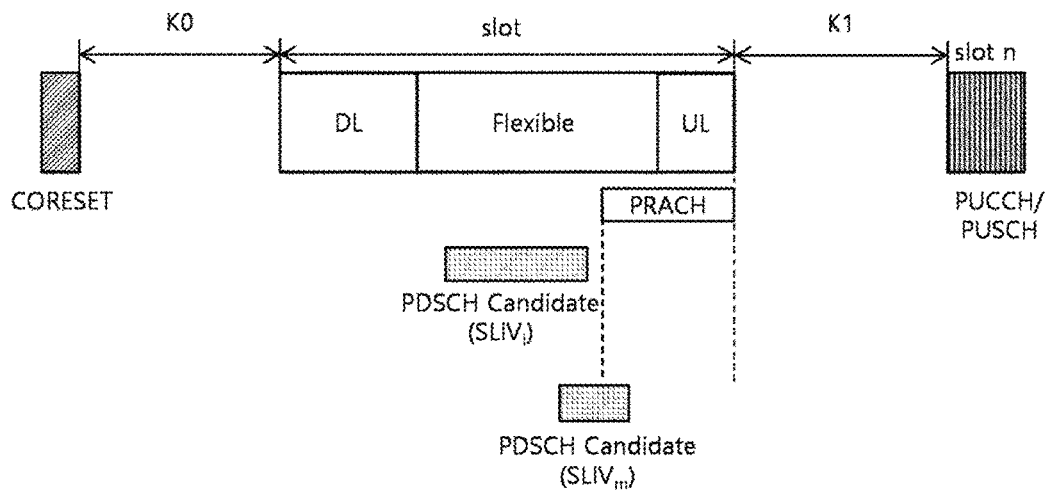
FIG. 17 shows that a user equipment according to an embodiment of the present invention determines a PDSCH candidate set based on a PRACH configuration.

FIG. 17 shows that a user equipment according to an embodiment of the present invention determines a PDSCH candidate set based on a PRACH set.

In the 3GPP NR system, the user equipment may perform transmission using random access using a physical random-access channel (PRACH) configured by the base station.

Specifically, when the PRACH is configured for the user equipment, the user equipment may obtain remaining minimum system information (RMSI) from the base station. In addition, the user equipment may obtain information on the PRACH transmission parameter from the base station. In this case, the information on the PRACH transmission parameter may include information on at least one of a PRACH preamble, a time resource in which the PRACH is transmitted, and a frequency resource in which the PRACH is transmitted. In addition, the user equipment may obtain information on the PRACH preamble from the base station. In this case, the information on the PRACH preamble may include information on at least one of a root sequence of the preamble and a cyclic shift value of the preamble. When a semi-static DL/UL is configured for the user equipment, the user equipment may transmit PRACH only on the UL symbol in a carrier or cell of FR1 (frequency band of 6 GHz or less). Therefore, when the DL symbol or the flexible symbol overlaps the PRACH, the user equipment may not be able to transmit the PRACH. When a semi-static DL/UL is configured for the user equipment, the user equipment may transmit PRACH on a UL symbol or a flexible symbol of a carrier or cell of FR2 (frequency band of 6 GHz or higher). Therefore, when the DL symbol or the flexible symbol overlaps the PRACH, the user equipment may not be able to transmit the PRACH. In addition, when the slot in which the PRACH transmission is configured in the carrier or cell of FR2 precedes the slot in which the SS/PBCH block is configured, the user equipment may not transmit the corresponding PRACH. Subsequently, the symbol used for PRACH transmission means a case where the above conditions are satisfied, unless otherwise specified in the description. When the user equipment determines that PRACH transmission is available on the carrier or cell of FR2, the user equipment may treat a symbol corresponding to the PRACH as a UL symbol.

When at least one of the symbols to which a PDSCH is allocated is used for RRACH transmission, the user equipment may not include the PDSCH in the PDSCH candidate set. That is, the user equipment may not include the PDSCH overlapping the symbol used for PRACH transmission in the PDSCH candidate set. The user equipment may generate a HARQ-ACK codebook except for the bit indicating the ACK/NACK of the PDSCH that overlaps the symbol used for PRACH transmission. When all the symbols to which the PDSCH is allocated are not used for PRACH transmission, the user equipment may include the PDSCH in the PDSCH candidate set.

In the embodiment of FIG. 17, symbols corresponding to each of the PDSCHs indicated by $SLIV_1$ and $SLIV_m$ overlap the flexible symbol. In addition, each PDSCH indicated by the $SLIV_1$ and the $SLIV_m$ satisfies the PDSCH candidate set conditions for K0 and K1. The PDSCH indicated by the $SLIV_1$ does not overlap a symbol through which the user equipment can transmit PRACH, but the PDSCH indicated by the SLIVm overlaps a symbol through which user equipment can transmit PRACH. Therefore, the user equipment includes the PDSCH indicated by the $SLIV_1$ in the PDSCH candidate set, and does not include the PDSCH indicated by the $SLIV_m$ in the PDSCH candidate set.

Figure 18:
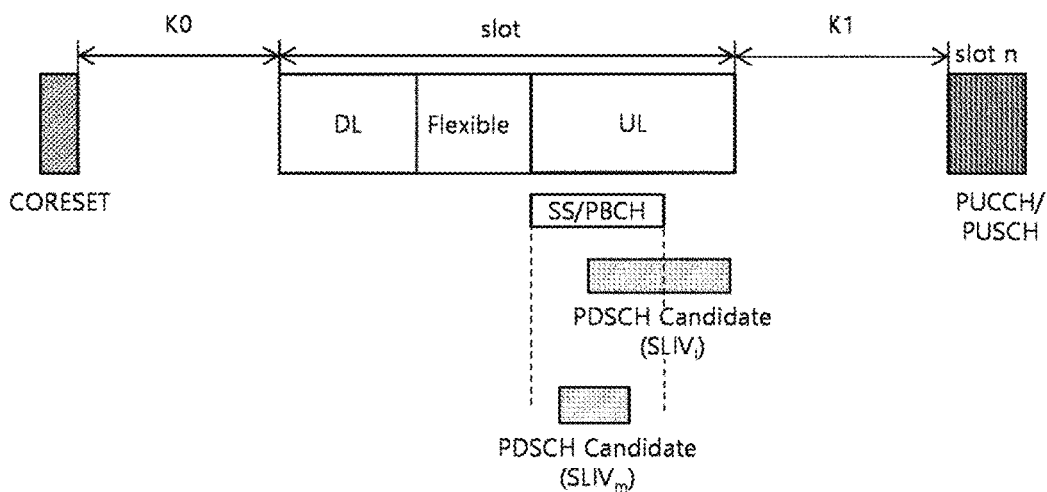
FIG. 18 shows that a user equipment according to an embodiment of the present invention determines a PDSCH candidate set based on a SS/PBCH block configuration.

FIG. 18 shows that a user equipment according to an embodiment of the present invention determines a PDSCH candidate set based on an SS/PBCH block set.

In the 3GPP NR system, the user equipment may obtain information for SS/PBCH block reception of the user equipment from the base station. The base station may configure information for receiving the SS/PBCH block of the user equipment to the user equipment. In this case, the information for SS/PBCH block reception may include SSB-transmitted-SIB1 transmitted in the cell-specific RRC signal. In addition, the information for SS/PBCH block reception includes SSBtransmitted transmitted in the UE-specific RRC signal. When the user equipment does not receive both SSB-transmitted-SIB1 and SSB-transmitted from the base station, the user equipment may monitor SS/PBCH block transmission at a predetermined position. When the user equipment receives SSB-transmitted-SIB1 from the base station and does not receive SSB-transmitted, the user equipment may monitor SS/PBCH block transmission configured by SSB-transmitted-SIM. When the user equipment receives SSB-transmitted, the user equipment may monitor SS/PBCH block transmission configured in SSB-transmitted. In the following description, SS/PBCH block transmission may indicate SS/PBCH block transmission monitored by the user equipment according to a configuration of base stations.

When a symbol is configured to be used for SS/PBCH transmission to the user equipment, the user equipment may determine that the symbol is a DL symbol. In this case, the symbol used for SS/PBCH block transmission may be configured through the cell-specific RRC signal (e.g., SSB-transmitted-SIB1) or a user equipment-specific RRC signal (e.g., SSB-transmitted). Even when the PDSCH overlapping the UL symbol or the flexible symbol overlaps the symbol used for SS/PBCH block transmission according to the semi-static DL/UL configuration and a PDSCH can be transmitted within a symbol overlapping a symbol used for SS/PBCH transmission, the user equipment may include the corresponding PDSCH in the PDSCH candidate set. Even when the PDSCH overlapping the UL symbol or the flexible symbol overlaps the symbol used for SS/PBCH block transmission according to the semi-static DL/UL configuration and a PDSCH can be transmitted within a symbol overlapping a symbol used for SS/PBCH transmission, the user equipment may generate a HARQ-ACK codebook by including a bit indicating the ACK/NACK of the corresponding PDSCH in the HARQ-ACK codebook. Also, even when the PDSCH overlapping a symbol used for PRACH transmission overlaps a symbol used for SS/PBCH block transmission, and a PDSCH can be transmitted within a symbol overlapping a symbol used for SS/PBCH transmission, the user equipment may include the corresponding PDSCH in the PDSCH candidate set. That is, even when the PDSCH overlapping a symbol used for PRACH transmission overlaps a symbol used for SS/PBCH block transmission, and a PDSCH can be transmitted within a symbol overlapping a symbol used for SS/PBCH transmission, the user equipment may include a bit indicating the ACK/NACK of the corresponding PDSCH in the HARQ-ACK codebook to generate the HARQ-ACK codebook. In the above embodiments, when a PDSCH can be transmitted within a symbol overlapping a symbol used for SS/PBCH transmission, it may be a case where all symbols allocated to a corresponding PDSCH overlap a symbol used for SS/PBCH transmission.

In the embodiment of FIG. 18, all symbols corresponding to each of the PDSCHs indicated by $SLIV_1$ and $SLIV_m$ overlap the UL symbol. However, all symbols corresponding to the PDSCH indicated by the $SLIV_m$ overlap symbols used for SS/PBCH transmission. Only some symbols corresponding to PDSCH indicated by the $SLIV_1$ overlap symbols used for SS/PBCH transmission. In addition, each PDSCH indicated by the $SLIV_m$ satisfies the PDSCH candidate set condition for K0 and K1. Therefore, the user equipment includes the PDSCH indicated by the $SLIV_m$ in the PDSCH candidate set, and does not include the PDSCH indicated by the $SLIV_1$ in the PDSCH candidate set.

Figure 19:
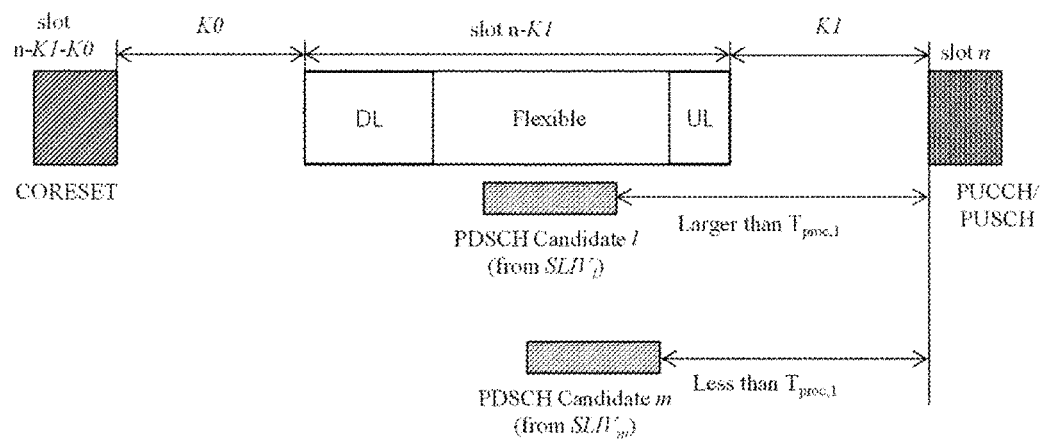
FIGS. 19 to 20 show that a user equipment according to an embodiment of the present invention receives PDSCH and determines a PDSCH candidate set based on the time required for processing HARQ-ACK information for the corresponding PDSCH.
Figure 20:
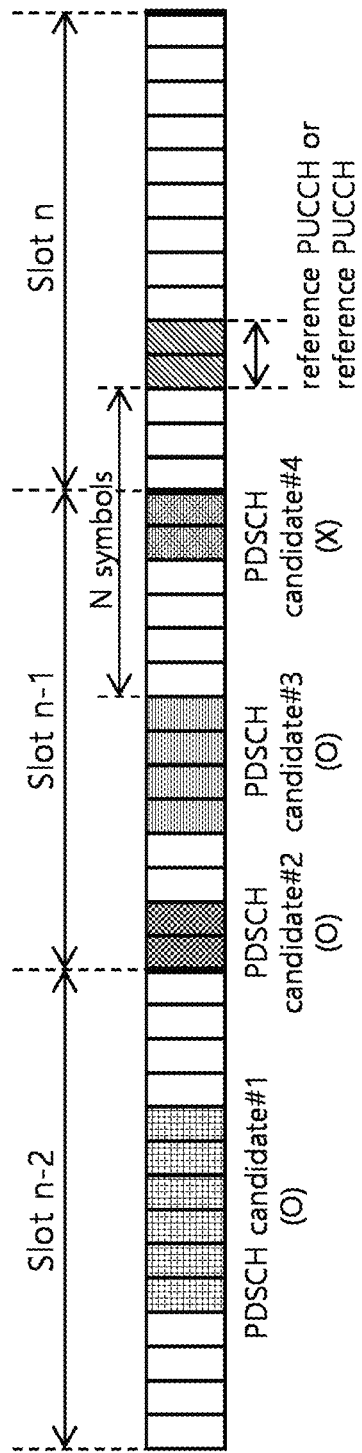

FIGS. 19 to 20 show that a user equipment receives PDSCH and determines a PDSCH candidate set based on the time required for processing HARQ-ACK information for the corresponding PDSCH according to an embodiment of the present invention.

The user equipment may determine the PDSCH candidate set based on the time required to process HARQ-ACK information for the PDSCH according to an embodiment of the present invention. The standard of the 3GPP NR system defines the time required for the user equipment to process HARQ-ACK information for the PDSCH as follows. When the first UL symbol of PUCCH or PUSCH transmitting HARQ-ACK information does not start earlier than symbol $L_1$, the corresponding user equipment must transmit valid HARQ-ACK information. The symbol $L_1$ is a UL symbol starting after $T_{proc,1}=((N_1+d_{1,1}+d_{1,2})*(2048+144)*64*2^{-\mu})$ $*T_C$ after the end of the last symbol of the PDSCH. In this case, $N_1$ is µ in Table 4 corresponding to min (µ_DL, µ_UL). µ_DL corresponds to the subcarrier spacing configuration of the DL channel in which the PDSCH is received, and µ_UL corresponds to the subcarrier spacing configuration of the UL channel through which HARQ-ACK information is transmitted. When HARQ-ACK information is transmitted through PUCCH, $d_{1,1}=0$. When HARQ-ACK information is transmitted through PUSCH, $d_{1,1}=1$. When the user equipment transmits using a plurality of component carriers (that is, when performing carrier aggregation), the position of the first symbol of the first PUCCH is determined in consideration of a timing difference between component carriers. When the mapping type of PDSCH is type A and the last symbol of PDSCH is the i-th symbol in the slot, and i<7, $d_{1,2}=7-i$ and $d_{1,2}=0$. When the mapping type of PDSCH is type B and the number of PDSCH symbols is 4, $d_{1,2}=3$. When the mapping type of PDSCH is type B and the number of PDSCH symbols is 2, $d_{1,2}=3+d$. In this case, d is the number of symbols that overlap the PDCCH scheduling the PDSCH and the corresponding PDSCH. In addition, $T_c$ is as follows.

$$T_C=1/(\Delta f_{max}*N_f), \Delta f_{max}=480*10^3, N_f=4096.$$

TABLE 4

| | PDSCH decoding time $N_1$ [symbols] | |
|---|---|---|
| µ | No additional POSCH DM-RS configured | Additional PDSCH DM-RS configured |
| 0 | 8 | 13 |
| 1 | 10 | 13 |
| 2 | 17 | 20 |
| 3 | 20 | 24 |

Unless otherwise specified, the fact that the PDSCH processing time condition is not satisfied in this specification indicates a case where the first UL symbol of a PUCCH or PUSCH in which a user equipment transmits HARQ-ACK information is ahead of an $L_1$ symbol. The user equipment may not include PDSCHs that do not satisfy the PDSCH processing time condition in the PDSCH candidate set. That is, the user equipment may generate the HARQ-ACK codebook except for the bit indicating the ACK/NACK of the PDSCH that does not satisfy the PDSCH processing time condition.

In these embodiments, when the user equipment obtains $T_{proc,1}$, the user equipment may assume that each of $d_{1,1}$ and $d_{1,2}$ is 0. In another specific embodiment, when the user equipment obtains $T_{proc,1}$, the user equipment may assume that $d_{1,1}$ and $d_{1,2}$ each have a maximum value which $d_{1,1}$ and $d_{1,2}$ each can have. In another specific embodiment, when the user equipment determines the PDSCH processing time condition, the user equipment may use $N_1$ of Table 4 instead of $T_{proc,1}$. In this case, $N_1$ indicates the number of symbols. Unless otherwise specified in this specification, the unit of $T_{proc,1}$ is ms.

In the embodiment of FIG. 19, symbols corresponding to each of the PDSCHs indicated by $SLIV_1$ and $SLIV_m$ overlap the flexible symbol. In addition, each PDSCH indicated by the $SLIV_1$ and the $SLIV_m$ satisfies the PDSCH candidate set conditions for K0 and K1. The time $(T_{proc,1})$ for processing the HARQ-ACK information for the PDSCH indicated by the $SLIV_1$ is shorter than the time from the end of the last symbol of the PDSCH to the start of the PUCCH or the start symbol of the PUSCH including the HARQ-ACK information. Therefore, the user equipment includes the PDSCH indicated by the $SLIV_1$ in the PDSCH candidate set. The time $(T_{proc,1})$ for processing the HARQ-ACK information for the PDSCH indicated by the $SLIV_m$ is longer than the time from the end of the last symbol of the PDSCH to the start of the PUCCH or the start symbol of the PUSCH including the HARQ-ACK information. Therefore, the user equipment does not include the PDSCH indicated by the $SLIV_m$ in the PDSCH candidate set.

In the embodiment of FIG. 20, the user equipment transmits PUCCH or PUSCH including HARQ-ACK information in slot n. In this case, there are four PDSCHs allocated to the user equipment. The number of symbols from the end of the last symbol of each of the first PDSCH PDSCH candidate #1, the second PDSCH PDSCH candidate #2, and the third PDSCH PDSCH candidate #3 to the start of the start symbol of PUCCH or PUSCH including HARQ-ACK information is greater than N, that is, the number of symbols derived from $T_{proc,1}$. In this case, it may be N=ceil($T_{proc,1}$/symbol_duration). symbol_duration indicates the length of each symbol. Also, it may be N=N1. N1 may be a value defined in Table 4 described above. In addition, the number of symbols from the end of the last symbol of each of the fourth PDSCH PDSCH candidate #4 to the start of the start symbol of PUCCH or PUSCH including HARQ-ACK information is greater than N, that is, the number of symbols derived from $T_{proc,1}$. Accordingly, the user equipment includes the first PDSCH PDSCH candidate #1, the second PDSCH PDSCH candidate #2, and the third PDSCH PDSCH candidate #3 in the PDSCH candidate set, and does not include the fourth PDSCH PDSCH candidate #4 in the PDSCH candidate set.

The embodiments described with reference to FIGS. 15 to 16 may be applied to each or some combinations of the embodiments described with reference to FIGS. 17 to 20. This will be described once again.

The user equipment determines the PDSCH candidate set based on the information signaled from the base station. In this case, the information signaled from the base station may include K1 described above. In addition, the information signaled from the base station may include a combination of K0 and the start symbol of the PDSCH and the length of the PDSCH described above. In addition, the information signaled from the base station may include the semi-static DL/UL configuration described above. When a symbol is configured to be used for SS/PBCH transmission to the user equipment, the user equipment may determine that the symbol is a DL symbol. In this case, the symbol used for SS/PBCH block transmission may be configured through the cell-specific RRC signal (e.g., SSB-transmitted-SIB1) or the UE-specific RRC signal (e.g., SSB-transmitted). In addition, the information signaled from the base station may include information on the configuration of CORECSET and search space described above. Also, the information signaled from the base station may include a PDSCH repetition value.

The user equipment determines whether a PDSCH candidate indicated by SLIV is valid for each of a plurality of K1 values and K0. For convenience of description, a slot through which PUCCH is transmitted is referred to as an n-th slot. When any of the symbols indicated by the SLIV as symbols to which the PDSCH is allocated in the (n−K1)-th slot corresponds to the UL symbol, the user equipment may determine that the PDSCH candidate indicated by the SLIV is not valid for the corresponding K1 value and K0. In addition, when the search space does not exist in the (n−K1−K0)-th slot, the user equipment may determine that the PDSCH candidate indicated by the SLIV is not valid for the corresponding K1 value and K0. In addition, when the time difference between the last symbol among symbols corresponding to the PDSCH indicated by the SLIV and the first symbol among the symbols corresponding to PUCCH or PUSCH in which HARQ-ACK information is transmitted does not satisfy the PDSCH processing time condition, the user equipment may determine that the PDSCH candidate indicated by the SLIV is not valid for the corresponding K1 value and K0.

When the user equipment determines that the PDSCH candidate indicated by the SLIV value is invalid, the user equipment may not include a combination of PDSCH candidates indicated by corresponding K1, K0, and SLIV in the PDSCH candidate set. When the user equipment determines that the PDSCH candidate indicated by the SLIV value is valid, the user equipment may include a combination of PDSCH candidates indicated by a corresponding K1 value, K0, and SLIV in the PDSCH candidate set.

The user equipment may determine whether a PDSCH candidate of a combination of a K1 value, K0, and SLIV included in a PDSCH candidate set and a PDSCH candidate of a combination of another K1 value, K0, and SLIV included in the PDSCH candidate set overlap in at least one symbol of any one slot. When the PDSCH candidate of a combination of a K1 value, K0, and SLIV included in the PDSCH candidate set and the PDSCH candidate of a combination of another K1 value, K0, and SLIV included in the PDSCH candidate set overlap in at least one symbol of any one slot, the user equipment combines two combinations into one combination.

The user equipment may determine, based on a position of the last symbol of the PDSCH included in the PDSCH candidate set, the position of HARQ-ACK information of the corresponding PDSCH in the semi-static HARQ-ACK codebook. Specifically, the user equipment may determine, according to the position of the last symbol of the PDSCH included in the PDSCH candidate set, the position of the bit indicating the ACK/NACK of the corresponding PDSCH in the HARQ-ACK codebook. Specifically, the position of the HARQ-ACK information of a PDSCH of which the last symbol is preceding may also be preceding. For example, when the last symbol of the first PDSCH is before the last symbol of the second PDSCH, in the HARQ-ACK codebook, the bit indicating the ACK/NACK of the first PDSCH may precede the bit indicating the ACK/NACK of the second PDSCH.

Figure 21:
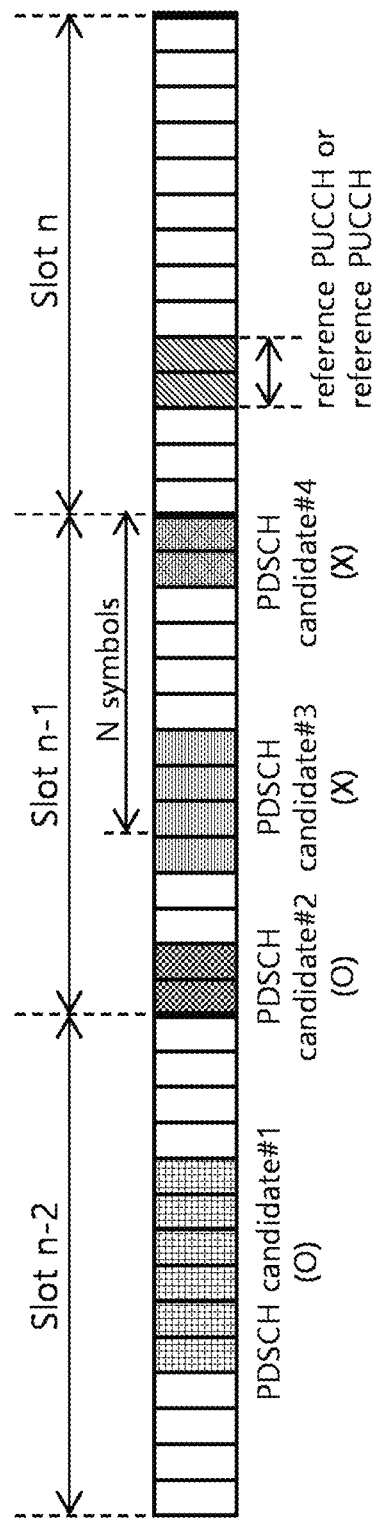
FIG. 21 shows that a user equipment according to an embodiment of the present invention determines a PDSCH candidate set based on a reference PUCCH resource or a reference PUSCH resource.

FIG. 21 shows that a user equipment according to an embodiment of the present invention determines a PDSCH candidate set based on a reference PUCCH resource or a reference PUSCH resource.

As described above, the user equipment may receive a PDSCH and determine whether to include the PDSCH in the PDSCH candidate set based on the time required for HARQ-ACK processing for the PDSCH. A plurality of PUCCH resource sets may be configured for the user equipment. In this case, the user equipment may determine one PUCCH resource set among the plurality of PUCCH resource sets according to a length of a UCI payload, and transmit the PUCCH using the determined PUCCH resource set. It may be determined according to a value of a PUCCH resource indicator (PRI) field of one PUCCH resource DCI in the PUCCH resource set. The PUCCH resource may be determined by at least the position of the start symbol and the number of symbols. Specifically, the PUCCH resource may be determined by the position of the start symbol, the number of symbols, the start PRB, and the number of PRBs.

The user equipment may receive a PDSCH and determine whether to include the corresponding PDSCH in the PDSCH candidate set based on the time required for HARQ-ACK processing for the corresponding PDSCH and the reference PUCCH resource or the reference PUSCH resource. The PUCCH resource indicates a resource through which PUCCH can be transmitted. Further, the PUSCH resource indicates a resource through which the PUSCH can be transmitted. Specifically, the user equipment may determine whether to include the corresponding PDSCH in the PDSCH candidate set based on the time difference from the end of the last symbol of the PDSCH received by the user equipment to the start of the first symbol of the reference PUCCH resource or the reference PUSCH resource and the time required for HARQ-ACK processing for the corresponding PDSCH. In a specific embodiment, when the time difference from the end of the last symbol of the PDSCH received by the user equipment to the start of the first symbol of the PUCCH resource is equal to or less than the time required for HARQ-ACK processing for the corresponding PDSCH, the user equipment may include the corresponding PDSCH in the PDSCH candidate set. For example, when the time difference between the last symbol among symbols corresponding to the PDSCH indicated by the SLIV and the first symbol among the symbols corresponding to the reference PUCCH or the reference PUSCH through which the HARQ-ACK is transmitted does not satisfy the PDSCH processing time condition, the user equipment may not include the PDSCH candidate indicated by the SLIV in the PDSCH candidate set.

The reference PUCCH resource may be a PUCCH resource actually used by the user equipment for PUCCH transmission. Specifically, the reference PUCCH resource may be a PUCCH resource indicated by PRI. In addition, the reference PUCCH resource may be a PUCCH resource in which a start symbol is the most advanced temporally among the PUCCH resources included in all PUCCH resource sets in one slot. This is because the PDSCH processing time condition is satisfied even when the user equipment selects any PUCCH resource if the reference PUCCH resource is the PUCCH resource in which the start symbol is the most advanced temporally among PUCCH resources included in all PUCCH resource sets in one slot. In addition, the reference PUCCH resource may be a PUCCH resource in which a start symbol is the latest temporally among the PUCCH resources included in all PUCCH resource sets in one slot. This is because the largest number of PDSCHs can be included in the PDSCH candidate set even when the user equipment selects any PUCCH resource if the reference PUCCH resource is the PUCCH resource in which the start symbol is the most advanced temporally among PUCCH resources included in all PUCCH resource sets in one slot. In these embodiments, if the length of the semi-static HARQ-ACK codebook is greater than a specific value, the user equipment may exclude the PUCCH resource transmitting the UCI which length is equal to or less than a specific length among the PUCCH resource set from the PUCCH resource set. The length of the HARQ-ACK codebook may indicate the length of the payload of the HARQ-ACK codebook. The specific value may be 2 bits.

As described above, the HARQ-ACK codebook may be piggybacked on PUSCH transmission. In this case, the user equipment may determine whether the PDSCH is included in the PDSCH candidate set by using the reference PUSCH resource instead of the reference PUCCH resource. The reference PUSCH resource may be a PUSCH resource indicated by DCI scheduling PUSCH. The reference PUSCH resource may be a PUSCH resource in which a start symbol is the most advanced among all PUSCH resources that can be indicated by DCI scheduling a PUSCH. This is because the PDSCH processing time condition is satisfied even when the user equipment selects any PUSCH resource if the reference PUSCH resource is the PUSCH resource in which the start symbol is the most advanced among all PUSCH resources that can be indicated by DCI scheduling PUSCH. In addition, the reference PUSCH resource may be the PUSCH resource in which the start symbol is the latest among all PUSCH resources that can be indicated by DCI scheduling the PUSCH. This is because the largest number of PDSCHs can be included in the PDSCH candidate set even when the user equipment selects any PUSCH resource if the reference PUSCH resource is a PUSCH resource in which the start symbol is the latest among all PUSCH resources that can be indicated by the DCI scheduling the PUSCH. In another specific embodiment, even if the HARQ-ACK codebook is piggybacked on PUSCH transmission, the user equipment may determine whether the PDSCH is included in the PDSCH candidate set using the reference PUCCH. Specifically, the user equipment may determine whether the PDSCH is included in the PDSCH candidate set by using a resource in which the start symbol is advanced among the reference PUCCH resource and the reference PUSCH resource.

In addition, when the time difference between the last symbol of the symbol corresponding to the PDSCH indicated by the SLIV and the first symbol of the slot including the PUCCH or the PUSCH to which the HARQ-ACK is transmitted does not satisfy the PDSCH processing time condition, the user equipment may not include the PDSCH candidate indicated by the SLIV in the PDSCH candidate set. In another specific embodiment, when the time difference between the last symbol among the symbols corresponding to PDSCH indicated by the SLIV and the first symbol of the next slot (e.g., (n+1)-th slot) of the slot (e.g., n-th slot) including the PUCCH or PUSCH in which HARQ-ACK is transmitted does not satisfy the PDSCH processing time condition, the user equipment may not include the PDSCH candidate indicated by the SLIV in the PDSCH candidate set.

In the embodiment of FIG. 21, the user equipment calculates N, which is the number of symbols corresponding to a time required for processing HARQ-ACK information for each PDSCH. Specifically, the user equipment may calculate N using N=ceil($T_{proc,1}$/symbol_duration). symbol_duration indicates the length of one symbol. Also, it may be N=$N_1$. In this case, $N_1$ may be a value defined in Table 4 described above. The symbol difference from the last symbol of the first PDSCH PDSCH candidate #1 to the first symbol of the slot including the reference PUCCH or the first symbol of the reference PUSCH is greater than N. In addition, the symbol difference from the last symbol of the second PDSCH PDSCH candidate #2 to the first symbol of the slot including the reference PUCCH or the first symbol of the reference PUSCH is greater than N. In addition, the symbol difference from the last symbol of the third PDSCH PDSCH candidate #3 to the first symbol of the slot including the reference PUCCH or the first symbol of the reference PUSCH is less than N. In addition, the symbol difference from the last symbol of the fourth PDSCH PDSCH candidate #4 to the first symbol of the slot including the reference PUCCH or the first symbol of the reference PUSCH is less than N. Therefore, the user equipment includes the first PDSCH PDSCH candidate #1 and the second PDSCH PDSCH candidate #2 in the PDSCH candidate set, and the user equipment may not include the third PDSCH PDSCH candidate #3 and the fourth PDSCH PDSCH candidate #4 in the PDSCH candidate set.

In another specific embodiment, when the time difference between the last symbol among the symbols corresponding to PDSCH indicated by the SLIV and the reference symbol of the slot (e.g., n-th slot) including the PUCCH or PUSCH in which HARQ-ACK is transmitted is included does not satisfy the PDSCH processing time condition, the user equipment may not include the PDSCH candidate indicated by the SLIV in the PDSCH candidate set. In this case, the reference symbol may be any one of the first, seventh, eighth, or fourteenth symbols in the slot.

In these embodiments, the above-described embodiments may be applied to operations other than the operation of determining the PDSCH processing time condition.

Figure 22:
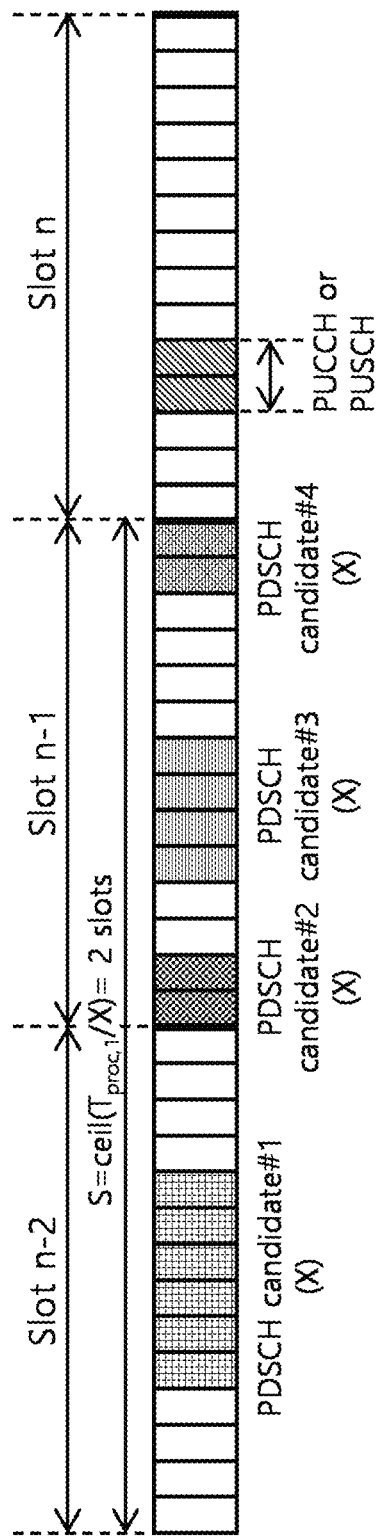
FIG. 22 shows that a user equipment according to an embodiment of the present invention determines a PDSCH candidate set by calculating the time required for HARQ-ACK processing for the PDSCH in units of slots.

FIG. 22 shows that a user equipment according to an embodiment of the present invention determines a PDSCH candidate set by calculating the time required for HARQ-ACK processing for the PDSCH in units of slots.

The user equipment may determine the PDSCH processing time condition in slot units. Specifically, when the time difference between the last symbol in the slot including the last symbol among symbols corresponding to PDSCH indicated by the SLIV and the first symbol of the slot including the PUCCH or the PUSCH in which the HARQ-ACK information is transmitted does not satisfy the PDSCH processing time condition, the user equipment may not include the PDSCH candidate indicated by the SLIV in the PDSCH candidate set. Specifically, when the time difference between the slot in which the PDSCH is received and the slot including the PUCCH or PUSCH in which the HARQ-ACK information is transmitted is smaller than the time required for the user equipment to process the HARQ-ACK information for the PDSCH, the user equipment may not include the corresponding PDSCH in the PDSCH candidate set. In addition, when the time difference between the slot in which the PDSCH is received and the slot including the PUCCH or PUSCH in which the HARQ-ACK information is transmitted greater than or equal to the time required for the user equipment to process the HARQ-ACK information for the PDSCH, the user equipment may include the corresponding PDSCH in the PDSCH candidate set. It is assumed that the length (duration) of one slot is X. The unit of X may be ms. In this case, when the user equipment transmits PUCCH or PUSCH in which the HARQ-ACK information is transmitted in the n-th slot, the user equipment may not include the PDSCH received in the (n−s)-th slot or the slot following the (n−s)-th slot in the PDSCH candidate set. In this case, it may be s=ceil($T_{proc,1}$/X). Also, it may be s=floor($T_{proc,1}$/X). Also, it may be s=round($T_{proc,1}$/X) round (x) indicates the rounding operation value of x.

In the embodiment of FIG. 22, the user equipment calculates s, which is the number of slots corresponding to a time required for processing HARQ-ACK information for each PDSCH. Specifically, the user equipment may calculate s using s=ceil($T_{proc,1}$/X). X represents the length (duration) of one slot. The values of s corresponding to the first PDSCH PDSCH candidate #1 to the fourth PDSCH PDSCH candidate #4 are all 2. The slot difference from the last symbol of the slot in which the first PDSCH PDSCH candidate #1 is received to the first symbol of the slot in which the PUCCH or PUSCH is transmitted is 2. In addition, the slot difference from the last symbol of the slot in which the second PDSCH PDSCH candidate #2, the third PDSCH PDSCH candidate #3, and the fourth PDSCH PDSCH candidate #4 are received to the first symbol of the slot in which PUCCH or PUSCH is transmitted is less than 2. Therefore, the user equipment may include the first PDSCH PDSCH candidate #1 in the PDSCH candidate set, and the user equipment may not include the second PDSCH PDSCH candidate #2, the third PDSCH PDSCH candidate #3, and the fourth PDSCH PDSCH candidate #4 in the PDSCH candidate set.

In these embodiments, the above-described embodiments may be applied to operations other than the operation of determining the PDSCH processing time condition.

Figure 23:
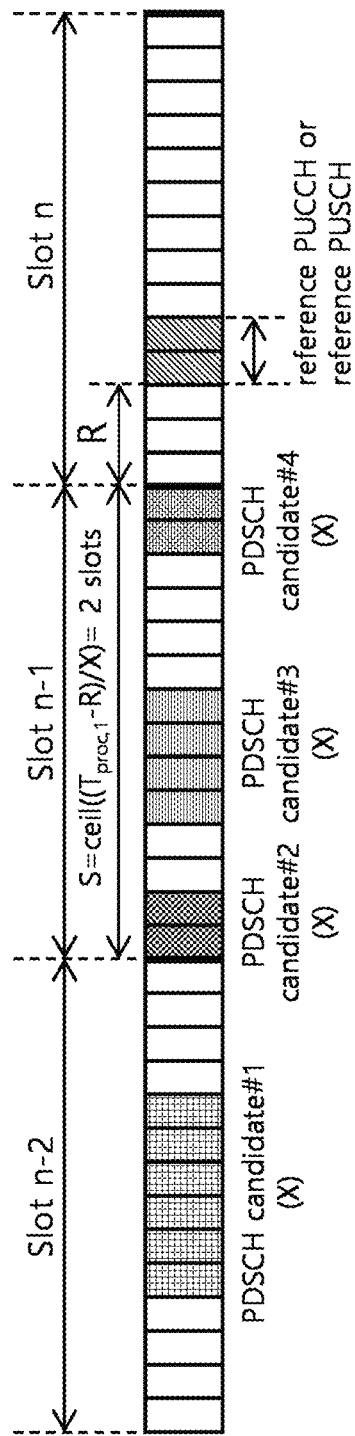
FIG. 23 shows that when a user equipment a calculates the time required for processing for transmitting HARQ-ACK information for the PDSCH in units of slots, the user equipment determines a PDSCH candidate set based on a reference PUCCH resource or a reference PUSCH resource.

FIG. 23 shows that when a user equipment according to an embodiment of the present invention calculates the time required for processing for transmitting HARQ-ACK information for the PDSCH in units of slots, the user equipment determines a PDSCH candidate set based on a reference PUCCH resource or a reference PUSCH resource.

When the user equipment calculates the time required for processing for transmitting HARQ-ACK information for the PDSCH according to the above-described embodiments in units of slots, the user equipment may determine the PDSCH candidate set based on the reference PUCCH resource or the reference PUSCH resource. In this case, the user equipment may determine the reference PUCCH resource or the reference PUSCH resource according to the embodiments described with reference to FIG. 21.

In the embodiment of FIG. 23, the user equipment calculates s, which is the number of slots corresponding to a time required for processing for transmission of HARQ-ACK information for each PDSCH. Specifically, the user equipment may calculate s using s=ceil($T_{proc,1}$/X). X represents the length (duration) of one slot. The values of s corresponding to the first PDSCH PDSCH candidate #1 to the fourth PDSCH PDSCH candidate #4 are all 2. The slot difference from the last symbol of the slot in which the first PDSCH PDSCH candidate #1 is received to the first symbol in the slot including the reference PUCCH resource or the reference PUSCH resource is 2. In addition, the slot difference from the last symbol of the slot in which each of the second PDSCH PDSCH candidate #2, the third PDSCH PDSCH candidate #3, and the fourth PDSCH PDSCH candidate #4 is received to the first symbol of the slot including the reference PUCCH resource or the reference PUSCH resource is less than 2. Therefore, the user equipment includes the first PDSCH PDSCH candidate #1 in the PDSCH candidate set, and the user equipment may not include the second PDSCH PDSCH candidate #2, the third PDSCH PDSCH candidate #3, and the fourth PDSCH PDSCH candidate #4 in the PDSCH candidate set.

In these embodiments, the above-described embodiments may be applied to operations other than the operation of determining the PDSCH processing time condition.

When the user equipment is configured by the base station to aggregate the slots to receive the PDSCH, the user equipment may receive at most one PDSCH in each slot. Specifically, when the user equipment is configured by the base station to aggregate the slots to receive the PDSCH, the user equipment can expect that up to one PDSCH reception is scheduled in one slot. In this case, when the repetition reception of the PDSCH is configured to be repeated in a plurality of slots, the user equipment may determine whether to satisfy the condition including the corresponding PDSCH in the PDSCH candidate set based on whether PDSCH reception is available in all slots in which the PDSCH is received. Specifically, when PDSCH reception is unavailable in at least one of all slots indicated as PDSCH reception, the user equipment may not include the PDSCH in the PDSCH candidate set. In this case, PDSCH reception may be PDSCH reception indicated by PDSCH mapping type A. PDSCH mapping type A indicates a PDSCH reception method in which the DMRS of the PDSCH is fixed to the third symbol of the slot or the fourth symbol of the slot. When the user equipment is configured by the base station to aggregate the slot to receive the PDSCH, the user equipment may determine the PDSCH candidate set as follows.

The user equipment may determine the size of the PDSCH candidate set according to floor(($K0_{max}$−$K0_{min}$+$K1_{max}$−$K1_{min}$)/$N_{rep}$). In this case, $K0_{max}$ represents the largest value among K0 values configured for the user equipment. In addition, $K1_{max}$ indicates the largest value among K1 values configured for the user equipment. In addition, $K0_{min}$ represents the smallest value among K0 values configured for the user equipment. In addition, $K1_{min}$ represents the smallest value among K1 values configured for the user equipment. In the present specification, floor(x) is the largest integer among integers less than or equal to x. In this case, $N_{rep}$ indicates the number of slots in which PDSCH is repeated and received. As described above, $N_{rep}$ may be configured through an RRC signal. In addition, when PDSCH repetition is not used, $N_{rep}$=1.

The user equipment may determine the PDSCH included in the PDSCH candidate set using the largest value of the K1 values. Specifically, the user equipment may determine the PDSCH included in the PDSCH candidate set using the largest value of K1, and $N_{rep}$. Specifically, the user equipment may determine whether the PDSCH candidate indicated by the SLIV is valid for the K1 and K0 values in descending order of the plurality of K1 values. In a specific embodiment, the user equipment may generate a semi-static HARQ-ACK codebook using the following operation. For convenience of description, a slot through which PUCCH is transmitted is referred to as an n-th slot.

1) The user equipment sets the length of the HARQ-ACK codebook to 0 bit.

2) The user equipment determines whether the PDSCH candidate indicated by the SLIV is valid for the $K1_{max}$ value and the K0 value. In this case, $K1_{max}$ is the largest value in the set of K1 values. $K1_{max}$ is excluded from the set of K1 values. In relation to all of the (n−$K1_{max}$)-th slot, the (n−$K1_{max}$−1)-th slot, . . . and the (n−$K1_{max}$−($N_{rep}$−1))-th slot, if any of the symbols indicated by the SLIV that the PDSCH candidate is allocated to in the corresponding slot overlaps the UL symbol, the user equipment may determine that the corresponding PDSCH candidate is invalid. Specifically, When all the symbols indicated by the SLIV as symbols to which the PDSCH is allocated does not correspond to the UL symbol in any one slot among the (n−K1)-th slot, the (n−K1-1)-th slot, . . . and the (n−K1-($N_{rep}$−1))-th slot, the user equipment may determine that the PDSCH candidate indicated by the SLIV is valid. In another specific embodiment, when at least one of the symbols indicated by the SLIV as symbols to which the PDSCH is allocated in the (n−K1 max−($N_{rep}$−1))-th slot overlaps the UL symbol, it may be determined that the PDSCH candidate is not valid. When all of the symbols indicated by the SLIV as symbols to which the PDSCH is allocated in the (n−K1$_{max}$−($N_{rep}$−1))-th slot do not overlap the UL symbol, it may be determined that the PDSCH candidate is valid.

3) For the PDSCH candidate for which the user equipment is valid in step 2), the user equipment increases the length of the HARQ-ACK codebook by 1 for HARQ-ACK transmission of the PDSCH.

4) For a valid PDSCH candidate, the user equipment excludes a value greater than K1$_{max}$−$N_{rep}$ from the set of K1 values. The user equipment stops the operation when the set of K1 values is an empty set, or repeats the process from 2) to 4).

The user equipment may determine the PDSCH included in the PDSCH candidate set using the smallest value of the K1 values. Specifically, the user equipment may determine the PDSCH included in the PDSCH candidate set using the smallest value of K1 and $N_{rep}$. Specifically, the user equipment may determine whether the PDSCH candidate indicated by the SLIV is valid for the K1 and K0 values in ascending order of the plurality of K1 values. In a specific embodiment, the user equipment may generate a semi-static HARQ-ACK codebook using the following operation. For convenience of description, a slot through which PUCCH is transmitted is referred to as an n-th slot.

1) The user equipment sets the length of the HARQ-ACK codebook to 0 bit.

2) The user equipment determines whether the PDSCH candidate indicated by SLIV is valid for the K1$_{min}$ value and the K0 value. In this case, K1$_{min}$ is the smallest value in the set of K1 values. K1$_{min}$ is excluded from the set of K1 values. In relation to all of the (n−K1 min)-th slot, the (n−K1$_{min}$-1)-th slot, . . . and the (n−K1$_{min}$−($N_{rep}$−1))-th slot, when any one of the symbols indicated by the SLIV as symbols to which the PDSCH is allocated in the corresponding slot corresponds to the UL symbol, the user equipment may determine that the corresponding PDSCH candidate is invalid. Specifically, when all the symbols indicated by the SLIV as symbols to which the PDSCH is allocated does not correspond to the UL symbol in any one slot among the (n−K1)-th slot, the (n−K1-1)-th slot, . . . and the (n−K1−($N_{rep}$−1))-th slot, the user equipment may determine that the corresponding PDSCH candidate is valid. In another specific embodiment, when at least one of the symbols indicated by the SLIV as symbols to which the PDSCH allocated in the (n−K1$_{min}$−($N_{rep}$−1))-th slot overlaps the UL symbol, it may be determined that the PDSCH candidate is not valid. When all of the symbols indicated by the SLIV as symbols to which the PDSCH is allocated in the (n−K1$_{min}$−($N_{rep}$−1))-th slot do not overlap the UL symbol, it may be determined that the PDSCH candidate is valid.

3) For the PDSCH candidate for which the user equipment is valid in step 2), the user equipment increases the length of the HARQ-ACK codebook by 1 for HARQ-ACK transmission of the PDSCH.

4) For a valid PDSCH candidate, the user equipment excludes a value less than K1$_{min}$−$N_{rep}$ from the set of K1 values. The user equipment stops the operation when the set of K1 values is an empty set, or repeats the process from 2) to 4).

When the user equipment aggregates the slots and receives the PDSCH (that is, when receiving the repetition of $N_{rep}$ times), the user equipment may determine the size of the HARQ-ACK codebook corresponding to the PDSCH based on the position of the first PDSCH reception. This is because when the user equipment is configured by the base station to aggregate the slots to receive the PDSCH, the user equipment may receive at most one PDSCH in each slot. Specifically, when the first PDSCH is received in any of the (n−((i*$N_{rep}$))-th slot to the (n−((i+1)*$N_{rep}$−1))-th slot, the user equipment may determine that the reception of the corresponding PDSCH corresponds to the i-th bit of the HARQ-ACK codebook. In this case, it may be i=floor (K1$_{max}$/$N_{rep}$)+1. For example, when the first PDSCH among the PDSCHs received by $N_{rep}$ times is received in one of the (n−$N_{rep}$)-th slot to the (n−(2*$N_{rep}$−1))-th slot, the user equipment may determine that the reception of the corresponding PDSCH corresponds to the first bit of the HARQ-ACK codebook. When the first PDSCH among the PDSCHs received by $N_{rep}$ times is received in one of the (n−2*$N_{rep}$)-th slot to the (n−(3*$N_{rep}$−1))-th slot, the user equipment may determine that the reception of the corresponding PDSCH corresponds to the second bit of the HARQ-ACK codebook.

Figure 24:
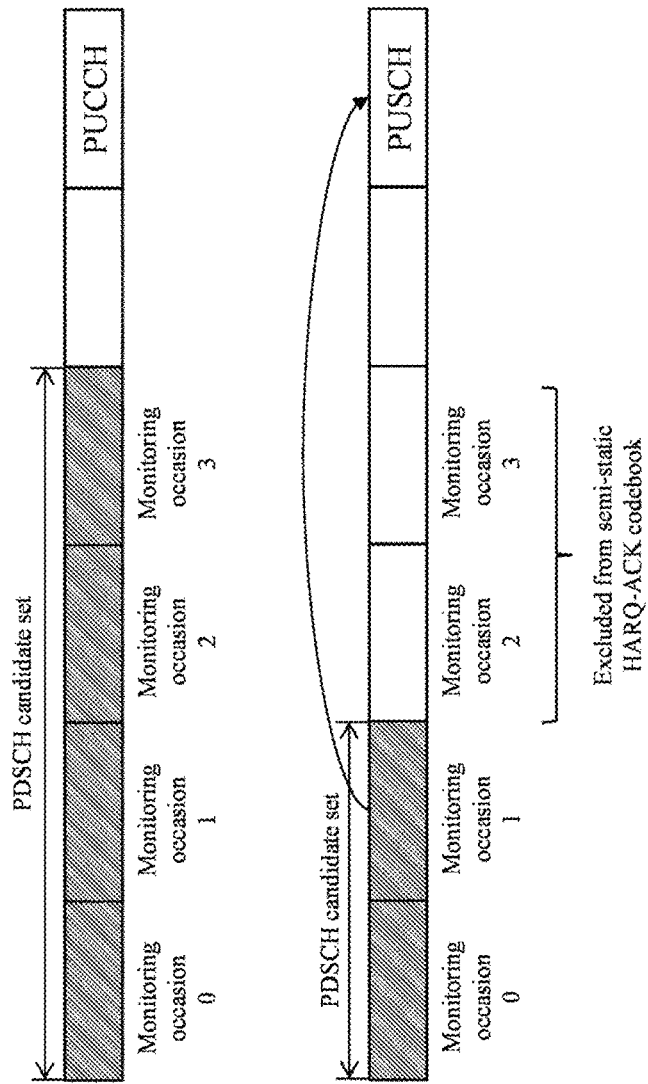
FIG. 24 shows that a method of a user equipment according to an embodiment of the present invention determines a PDSCH candidate set according to whether the PDSCH is scheduled by the PDCCH received after the PDCCH that schedules the PUSCH including the HARQ-ACK codebook.

FIG. 24 shows a method of a user equipment according to an embodiment of the present invention determines a PDSCH candidate set according to whether a PDSCH is scheduled by a PDCCH received after a PDCCH that schedules a PUSCH including an HARQ-ACK codebook.

When the user equipment's semi-static HARQ-ACK codebook transmission is configured, the user equipment may piggyback the semi-static HARQ-ACK codebook on the PUSCH and transmit it. When the time resource of the PUCCH and the time resource of the PUSCH that transmit the semi-static HARQ-ACK codebook overlap, the user equipment may piggyback the semi-static HARQ-ACK codebook on the PUSCH and transmit it. In this case, the overlap of the time resource of the PUCCH and the time resource of the PUSCH may mean that slots in which the PUCCH and the PUSCH are positioned are the same. In addition, the overlapping of the time resource of the PUCCH and the time resource of the PUSCH may mean that symbols in which the PUCCH and the PUSCH are located are the same. In addition, overlapping of the time resource of the PUCCH and the time resource of the PUSCH may mean that at least one of the symbols of the PUCCH and at least one of the symbols of the PUSCH is located in the same symbol.

When the PUSCH includes the HARQ-ACK codebook, the base station does not expect that the PDSCH scheduled by the PDCCH received after the PDCCH scheduling the PUSCH including the HARQ-ACK codebook is transmitted through the HARQ-ACK codebook included in the PUSCH. Therefore, the user equipment may not include the PDSCH scheduled in the search space located after the PDCCH for scheduling the PUSCH in the PDSCH candidate set. That is, the user equipment may not include the HARQ-ACK information of the PDSCH scheduled in the search space located after the PDCCH scheduling the PUSCH in the HARQ-ACK codebook. There are four monitoring occasions in the embodiment of FIG. 16. When the user equipment transmits the HARQ-ACK codebook through the PUCCH, the user equipment includes the PDSCH scheduled by the PDCCH received in 4 monitoring occasions in the PDSCH candidate set. In this case, the PUSCH is scheduled by DCI received in the second monitoring occasion Monitoring occasion 1.

HARQ-ACK codebook is transmitted through the corresponding PUSCH. Therefore, the user equipment does not include the PDSCH scheduled by the DCI received in the third monitoring occasion Monitoring occasion 2 and the fourth monitoring occasion Monitoring occasion 3 in the PDSCH candidate set.

Specifically, the user equipment may operate as follows. The user equipment may transmit the PUSCH by piggybacking the UCI including the HARQ-ACK codebook in the n-th slot. In this case, DCI scheduling PUSCH is received in the search space of the p-th slot. When p<n and n−K1−($N_{REF}$−1)−K0>p, the user equipment may not include the PDSCH scheduled by the DCI received in the search space after the search space of the p-th slot in the PDSCH candidate set. This is because it can be assumed that the HARQ-ACK information on the PDSCH scheduled by the DCI received in the search space located after the p-th slot in the PUSCH cannot be transmitted. When the user equipment piggybacks the UCI including the HARQ-ACK codebook on the PUSCH and transmits the PUSCH, the user equipment may configure the size of the HARQ-ACK codebook based on the PDCCH scheduling the PUSCH. Specifically, the user equipment may reduce the size of the HARQ-ACK codebook based on the PDCCH scheduling the corresponding PUSCH.

Figure 25:
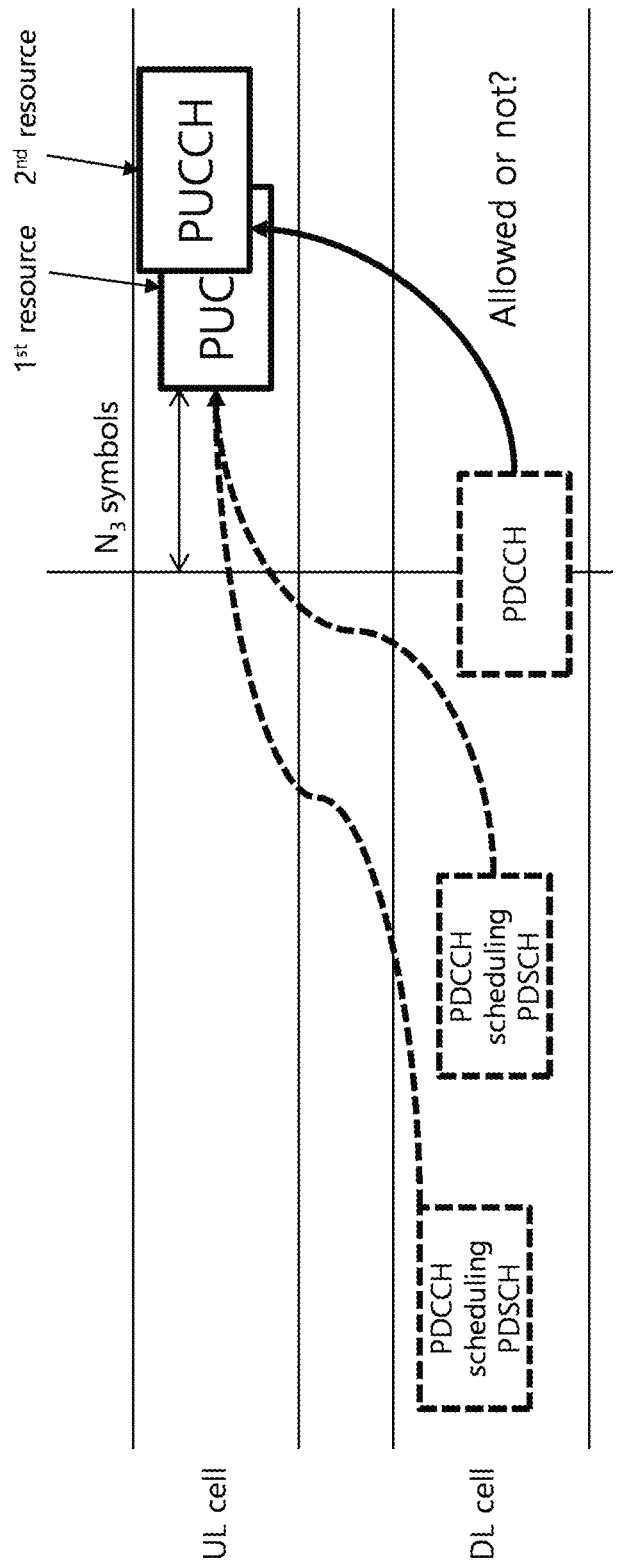
FIG. 25 shows that after a user equipment according to an embodiment of the present invention receives the PDCCH indicating the transmission of the PUCCH including HARQ-ACK information, the user equipment receives PDCCH changing a resource in which the transmission of a corresponding PUCCH is indicated.

FIG. 25 shows that after a user equipment according to an embodiment of the present invention receives the PDCCH indicating the transmission of the PUCCH including HARQ-ACK information, the user equipment receives a PDCCH changing a resource in which the transmission of a corresponding PUCCH is indicated.

In FIG. 25, the user equipment is indicated to transmit a PUCCH including HARQ-ACK information for two PDSCHs, which are respectively scheduled by two PDCCHs, in the first PUCCH resource. The user equipment receives a PDCCH indicating to transmit the PUCCH in the second PUCCH resource after a time preceding the $N_3$ symbols from the start symbol of the first PUCCH resource. As described above, when the user equipment receives the PDSCH and the PUCCH resource is changed before transmitting HARQ-ACK information for the corresponding PDSCH, the user equipment may not be able to transmit PUCCH according to the changed PUCCH resource. $N_3$ may be determined according to a minimum time required for the user equipment to process HARQ-ACK information for the PDSCH. Specifically, when the time from obtaining information indicated to be changed by the PUCCH resource to starting PUCCH transmission is shorter than the time required for the user equipment to process HARQ-ACK information for the PDSCH (i.e., when it is shorter than $N_3$), the user equipment may not be able to transmit PUCCH according to the changed PUCCH resource. A method for preventing this will be described.

The user equipment may not expect to receive the PDCCH changing the PUCCH resource within a predetermined advanced time from a start symbol of the PUCCH transmission indicated by the base station. In addition, the base station may not transmit the PDCCH changing the PUCCH resource received by the user equipment after the predetermined advanced time from the start symbol of the PUCCH transmission indicated by the base station. Specifically, even if the user equipment receives a PDCCH that changes the PUCCH resource of the corresponding PUCCH after the predetermined advanced time from the start symbol of PUCCH transmission indicated by the base station, the user equipment may not change the PUCCH resource according to the corresponding PDDCH. When the user equipment receives the PDCCH changing the PUCCH resource after the predetermined advanced time from the start symbol of the PUCCH transmission, the user equipment may ignore the PDCCH. When the user equipment receives a PDCCH that changes the PUCCH resource of the corresponding PUCCH before the predetermined advanced time from the start symbol of PUCCH transmission indicated by the base station, the user equipment may transmit PUCCH in the PUCCH resource changed according to the corresponding PDCCH. In this case, the time that is advanced by the predetermined advanced time may be determined according to the user equipment's capability and subcarrier spacing. In addition, the time preceding the predetermined advanced time may be specified as the number of symbols. The number of symbols may be referred to as $N_3$. In detail, $N_3$ may be determined according to a minimum time required for the user equipment to process HARQ-ACK information for the PDSCH.

As described above, the PUCCH resource including the HARQ-ACK information may be indicated to the user equipment by the PUCCH Resource Indicator (PRI) of the PDCCH scheduling the PDSCH corresponding to the HARQ-ACK information included in the PUCCH. Therefore, the user equipment may not expect to receive the PRI of the PDCCH scheduling the PDSCH corresponding to the HARQ-ACK information included in the corresponding PUCCH that indicates a resource other than the PUCCH resource of the corresponding PUCCH after a predetermined advanced time (e.g., $N_3$ symbols) from the start symbol of the PUCCH transmission indicated by the base station. For convenience of explanation, the PRI of the PDCCH scheduling the PDSCH corresponding to the HARQ-ACK information included in the PUCCH indicating the resource other than the PUCCH resource of the corresponding PUCCH is referred to as a PUCCH resource change PRI. Specifically, even if the user equipment receives the PUCCH resource change PRI after a predetermined advanced time (e.g., $N_3$ symbols) from the start symbol of the PUCCH transmission indicated by the base station, the user equipment may not change the PUCCH resource according to the corresponding PDDCH. When the user equipment receives the PUCCH resource change PRI after a predetermined advanced time (e.g., $N_3$ symbols) from the start symbol of PUCCH transmission, the user equipment may ignore the corresponding PDCCH. When the user equipment receives the PUCCH resource change PRI before a predetermined advanced time (e.g., $N_3$ symbols) from the start symbol of the PUCCH transmission indicated by the base station, the user equipment may transmit PUCCH in the PUCCH resource changed according to the corresponding PDCCH. In addition, the base station may not transmit the PDCCH resource change PRI to be received by the user equipment after a predetermined advanced time (e.g., $N_3$ symbols) from a start symbol of the PUCCH transmission indicated by the base station.

When the type of the user equipment's HARQ-ACK codebook is configured as a dynamic HARQ-ACK codebook (i.e., the type-2 HARQ-ACK codebook), the PUCCH resource may be changed according to the PDCCH scheduling the PDSCH corresponding to the HARQ-ACK information to be transmitted in the same slot as the slot in which the PUCCH is transmitted. Specifically, the user equipment may determine the size of the HARQ-ACK codebook based on the number of PDCCHs scheduling the PDSCH corresponding to HARQ-ACK information to be transmitted in the same slot as the slot in which the transmission of the PUCCH received by the user equipment is indicated. For example, when the user equipment additionally receives a PDCCH scheduling the PDSCH corresponding to HARQ-ACK information to be transmitted in the same slot as the slot in which the transmission of the PUCCH is indicated, the user equipment may need to increase the size of the HARQ-ACK codebook to include the HARQ-ACK of this PDSCH. The user equipment may determine the PUCCH resource set according to the size (i.e., the number of bits of the HARQ-ACK codebook) of the HARQ-ACK codebook to be transmitted through the PUCCH. In this case, the user equipment may select a PUCCH resource to be used for PUCCH transmission from the PUCCH resource set based on the value of the PRI field of the last PDCCH received last temporally among the PDCCHs scheduling the PDSCH. Accordingly, when the user equipment receives the PDCCH scheduling the PDSCH corresponding to the HARQ-ACK information to be transmitted in the same slot as the slot in which the transmission of the PUCCH received by the user equipment is indicated, the PUCCH resource may be changed.

Therefore, the user equipment may not expect to receive the PDCCH changing the PUCCH resource set or PUCCH resource as the PDCCH scheduling the PDSCH corresponding to HARQ-ACK information to be transmitted in the same slot as the slot in which the PUCCH is transmitted after the predetermined advanced time (e.g., $N_3$ symbols) from the start symbol of the PUCCH transmission indicated by the base station. As a PDCCH scheduling the PDSCH corresponding to HARQ-ACK information to be transmitted in the same slot as the indicated PUCCH transmission for convenience of description, the PDCCH changing the PUCCH resource set is referred to as an HARQ-ACK additional PDCCH. Specifically, even if the user equipment receives the HARQ-ACK additional PDCCH after the predetermined advanced time (e.g., $N_3$ symbols) from the start symbol of the PUCCH transmission indicated by the base station, the user equipment may not change the PUCCH resource according to the corresponding PDDCH. When the user equipment receives the HARQ-ACK additional PDCCH after the predetermined advanced time (e.g., $N_3$ symbols) from the start symbol of PUCCH transmission, the user equipment may ignore the corresponding PDCCH. When the user equipment receives the HARQ-ACK additional PDCCH before the predetermined advanced time (e.g., $N_3$ symbols) from the start symbol of the PUCCH transmission indicated by the base station, the user equipment may transmit PUCCH in the PUCCH resource changed according to the corresponding PDCCH. Therefore, even if the user equipment receives the PDCCH scheduling the PDSCH corresponding to HARQ-ACK information to be transmitted in the same slot as the slot in which the PUCCH is transmitted after the predetermined advanced time (e.g., $N_3$ symbols) from the start symbol of the PUCCH transmission indicated by the base station, the PDCCH may not need to add bits of the HARQ-ACK codebook. In this case, the user equipment may transmit HARQ-ACK information for the PDSCH scheduled by the corresponding PDCCH through the corresponding PUCCH. In addition, the base station may not transmit the HARQ-ACK additional PDCCH received by the user equipment after the predetermined advanced time (e.g., $N_3$ symbols) from the start symbol of the PUCCH transmission indicated by the base station.

The PUCCH resource set and PUCCH resource may be configured differently according to UL BWP. This is because UL transmission of the user equipment is performed within the UL BWP. Therefore, the user equipment may not expect to receive the PDCCH indicating the change of the UL BWP after a predetermined advanced time (e.g., $N_3$ symbols) from the start symbol of the PUCCH transmission indicated by the base station. Specifically, even if the user equipment receives the PDCCH indicating a change of the UL BWP after the predetermined advanced time (e.g., $N_3$ symbols) from the start symbol of the PUCCH transmission indicated by the base station, the user equipment may not change the PUCCH resource according to the corresponding PDCCH. When the user equipment receives the PDCCH indicating a change of the UL BWP after a predetermined advanced time (e.g., $N_3$ symbols) from the start symbol of PUCCH transmission, the user equipment may ignore the corresponding PDCCH. When the user equipment receives the PDCCH indicating a change of the UL BWP before the predetermined advanced time (e.g., $N_3$ symbols) from the start symbol of the PUCCH transmission indicated by the base station, the user equipment may change the UL BWP based on the corresponding PDCCH, and may transmit PUCCH in the changed UL BWP. Specifically, when the user equipment receives the PDCCH indicating a change of the UL BWP before the predetermined advanced time (e.g., $N_3$ symbols) from the start symbol of the PUCCH transmission indicated by the base station, the user equipment may transmit PUCCH in the PUCCH resource changed according to the changed UL BWP. In addition, even if the user equipment changes the PUCCH resource after the predetermined advanced time (e.g., $N_3$ symbols) from the start symbol of the PUCCH transmission indicated by the base station, the PDCCH may not indicate the UL BWP change. Even if the user equipment changes the PUCCH resource after the predetermined advanced time (e.g., $N_3$ symbols) from the start symbol of the PUCCH transmission indicated by the base station, the user equipment may expect to receive a PDCCH that does not indicate a UL BWP change. In this case, the user equipment may transmit the PUCCH according to the PUCCH resource changed by the corresponding PDCCH. In addition, the base station may not transmit the PDCCH indicating a change of the UL BWP received by the user equipment after the predetermined advanced time (e.g., $N_3$ symbols) from a start symbol of the PUCCH transmission indicated by the base station.

When the type of the user equipment's HARQ-ACK codebook is configured as a semi-static HARQ-ACK codebook (i.e., a type-1 HARQ-ACK codebook), the PUCCH resource may be changed according to a PDCCH indicating a change in DL BWP. Specifically, when the user equipment receives the PDCCH indicating the change of the DL BWP, the user equipment may change the DL BWP based on the corresponding PDCCH. When the user equipment changes the DL BWP, the user equipment may not transmit HARQ-ACK information for the PDSCH scheduled before the DL BWP change to the base station. Specifically, when the user equipment receives the DCI changing the DL BWP from the base station, the user equipment may exclude the PDSCH scheduled by the PDCCH received before the DL BWP change from the PDSCH candidate set. Therefore, when the user equipment changes the DL BWP by receiving the PDCCH indicating the change of the DL BWP from the base station, the size of the semi-static HARQ-ACK codebook may be reduced. As the size of the HARQ-ACK codebook decreases, the number of HARQ-ACK bits decreases, so the PUCCH resource may be changed as described above.

Therefore, the user equipment may not expect to receive the PDCCH indicating the change of the DL BWP after a predetermined advanced time (e.g., $N_3$ symbols) from the start symbol of the PUCCH transmission indicated by the base station. Specifically, even if the user equipment receives the PDCCH indicating a change of the DL BWP after the predetermined advanced time (e.g., $N_3$ symbols) from the start symbol of the PUCCH transmission indicated by the base station, the user equipment may not change the PUCCH resource according to the corresponding PDCCH. When the user equipment receives the PDCCH indicating a change of the DL BWP after the predetermined advanced time (e.g., $N_3$ symbols) from the start symbol of PUCCH transmission, the user equipment may ignore the corresponding PDCCH. When the user equipment receives the PDCCH indicating a change of the DL BWP before a predetermined advanced time (e.g., $N_3$ symbols) from the start symbol of the PUCCH transmission indicated by the base station, the user equipment may transmit the PUCCH by excluding the HARQ-ACK information of the PDSCH scheduled before the PDCCH indicating the change of the DL BWP from the PUCCH resource changed according to the corresponding PDCCH from the semi-static HARQ-ACK codebook. In addition, even if the user equipment changes the PUCCH resource after the predetermined advanced time (e.g., $N_3$ symbols) from the start symbol of the PUCCH transmission indicated by the base station, the PDCCH may not indicate the DL BWP change. Even if the user equipment changes the PUCCH resource after the predetermined advanced time (e.g., $N_3$ symbols) from the start symbol of the PUCCH transmission indicated by the base station, the user equipment may expect to receive a PDCCH that does not indicate a UL BWP change. In this case, the user equipment may transmit the PUCCH by reflecting the PUCCH resource changed by the corresponding PDCCH. In addition, the base station may not transmit the PDCCH indicating a change of the DL BWP received by the user equipment after the predetermined advanced time (e.g., $N_3$ symbols) from the start symbol of the PUCCH transmission indicated by the base station. In the above-described embodiments, it has been described as a case where a semi-static HARQ-ACK codebook is configured for the user equipment. However, even if a dynamic HARQ-ACK codebook is configured for the user equipment, the above-described embodiments may be applied. In the above embodiments, the PDCCH indicating the change of the DL BWP may schedule the PDSCH. In this case, the corresponding PDCCH may indicate that HARQ-ACK of the corresponding PDSCH is transmitted through the PUCCH first indicated by the base station. However, when these embodiments are applied, there may be a time interval in which the DL BWP of the user equipment cannot be changed. Therefore, these embodiments may not be suitable to be applied to a user equipment or service requiring a fast DL BWP change.

Therefore, even if the DL BWP is changed after the predetermined advanced time (e.g., $N_3$ symbols) from the start symbol of the PUCCH transmission indicated by the base station, the user equipment can maintain the size of the HARQ-ACK codebook the same as before the DL BWP changes. In a specific embodiment, when the DL BWP is changed after the predetermined advanced time (e.g., $N_3$ symbols) from the start symbol of PUCCH transmission, the user equipment may transmit a semi-static HARQ-ACK codebook including HARQ-ACK information for the PDSCH scheduled before the DL BWP change. In this case, the user equipment may configure HARQ-ACK information for the PDSCH scheduled before the DL BWP change to NACK. In addition, when the DL BWP is changed before the predetermined advanced time (e.g., $N_3$ symbols) from the start symbol of PUCCH transmission, the user equipment may not include HARQ-ACK information for the PDSCH scheduled before the DL BWP change in the semi-static HARQ-ACK codebook. In another specific embodiment, the user equipment may insert padding bits into the semi-static HARQ-ACK codebook as long as the PUCCH resource set remains the same as before DL BWP is changed. The range of the number of UCI bits corresponding to the PUCCH resource set before the DL BWP change is referred to as A bits to B bits. In addition, the size of the UCI excluding the HARQ-ACK information for the PDSCH scheduled before the DL BWP change from the semi-static HARQ-ACK codebook is referred to as C. At this time, if the size of C is smaller than the size of A, the user equipment may add A-C bits to the HARQ-ACK codebook in order for the HARQ-ACK codebook to satisfy the minimum value of the number of UCI bits corresponding to the PUCCH resource set. If the size of C is equal to or greater than the size of A, the user equipment may transmit the semi-static HARQ-ACK codebook through PUCCH by excluding the HARQ-ACK information for the PDSCH scheduled before the DL BWP change from the semi-static HARQ-ACK codebook. Even if the DL BWP is changed through these embodiments, the user equipment may transmit PUCCH in the same PUCCH resource of the same PUCCH resource set.

In the above-described embodiments, the physical data channel may include a PDSCH or a PUSCH. In addition, the physical control channel may include a PDCCH or a PUCCH. In addition, in the embodiment described using PUSCH, PDCCH, PUCCH, and PDCCH, other types of data channels and control channels may be applied.

The method and system of the present disclosure are described in relation to specific embodiments, configuration elements, a part of or the entirety of operations of the present disclosure may be implemented using a computer system having general purpose hardware architecture.

The aforementioned description of the present disclosure has been presented for the purposes of illustration and description. It is apparent to a person having ordinary skill in the art to which the present disclosure relates that the present disclosure can be easily modified into other detailed forms without changing the technical principle or essential features of the present disclosure. Therefore, these embodiments as described above are only proposed for illustrative purposes and do not limit the present disclosure. For example, each component described to be of a single type can be implemented in a distributed manner. Likewise, components described to be distributed can be implemented in a combined manner.

The scope of the present disclosure is presented by the accompanying Claims rather than the aforementioned description. It should be understood that all changes or modifications derived from the definitions and scopes of the Claims and their equivalents fall within the scope of the present disclosure.

The invention claimed is:

1. A user equipment configured to operate in a wireless communication system, the user equipment comprising:
a communication module; and
a processor configured to control the communication module,
wherein the processor is configured to:
receive a physical downlink shared channel (PDSCH) on one of a plurality of downlink (DL) bandwidth parts (BWPs) of a cell,
based on the reception of the PDSCH, determine a physical uplink control channel (PUCCH) resource for a semi-static hybrid automatic repeat request acknowledgement (HARQ-ACK) codebook,
wherein the PUCCH resource belongs to a PUCCH resource set associated with a size of the semi-static HARQ-ACK codebook, and
receive a physical downlink control channel (PDCCH), wherein,
when the PDCCH is received earlier than a specific time duration prior to the PUCCH resource and the PDCCH indicates a DL BWP change of the cell, the size of the semi-static HARQ-ACK codebook is determined according to the DL BWP change of the cell, and
wherein,
when the PDCCH is received within the specific time duration prior to the PUCCH resource, the user equipment does not expect that the PDCCH indicates the DL BWP change of the cell, whereby the size of the semi-static HARQ-ACK codebook is not changed.

2. The user equipment of claim 1, wherein the specific time duration is specified by a number of symbols prior to a starting symbol of the PUCCH resource.

3. The user equipment of claim 1, wherein the specific time duration is determined based on a user equipment capability and a subcarrier spacing.

4. The user equipment of claim 1, wherein the semi-static HARQ-ACK codebook is transmitted by using the PUCCH resource.

5. The user equipment of claim 1, wherein the PUCCH resource set is selected from a plurality of PUCCH resource sets based on the size of the semi-static HARQ-ACK codebook.

6. A method performed by a user equipment in a wireless communication system, the method comprising:
receiving a physical downlink shared channel (PDSCH) on one of a plurality of downlink (DL) bandwidth parts (BWPs) of a cell; and
based on the reception of the PDSCH,
determining a physical uplink control channel (PUCCH) resource for a semi-static hybrid automatic repeat request acknowledgement (HARQ-ACK) codebook,
wherein the PUCCH resource belongs to a PUCCH resource set associated with a size of the semi-static HARQ-ACK codebook; and
receiving a physical downlink control channel (PDCCH), wherein,
when the PDCCH is received earlier than a specific time duration prior to the PUCCH resource and the PDCCH indicates a DL BWP change of the cell, the size of the semi-static HARQ-ACK codebook is determined according to the DL BWP change of the cell, and
wherein,
when the PDCCH is received within the specific time duration prior to the PUCCH resource, the user equipment does not expect that the PDCCH indicates the DL BWP change of the cell, whereby the size of the semi-static HARQ-ACK codebook is not changed.

7. The method of claim 6, wherein the specific time duration is specified by a number of symbols prior to a starting symbol of the PUCCH resource.

8. The method of claim 6, wherein the specific time duration is determined based on a user equipment capability and a subcarrier spacing.

9. The method of claim 6, wherein the semi-static HARQ-ACK codebook is transmitted by using the PUCCH resource.

10. The method of claim 6, wherein the PUCCH resource set is selected from a plurality of PUCCH resource sets based on the size of the semi-static HARQ-ACK codebook.

11. The user equipment of claim 1, wherein when the PDCCH is received earlier than the specific time duration prior to the PUCCH resource and indicates the DL BWP change of the cell, the semi-static HARQ-ACK codebook is generated without HARQ-ACK information corresponding to a PDSCH reception before the DL BWP change of the cell.

12. The method of claim 6, wherein when the PDCCH is received earlier than the specific time duration prior to the PUCCH resource and indicates the DL BWP change of the cell, the semi-static HARQ-ACK codebook is generated without HARQ-ACK information corresponding to a PDSCH reception before the DL BWP change of the cell.

* * * * *